United States Patent
Bounds, Jr.

(10) Patent No.: US 6,601,533 B1
(45) Date of Patent: Aug. 5, 2003

(54) EGG INJECTION APPARATUS AND METHOD

(76) Inventor: Edward G. Bounds, Jr., 1707 Timberlake Dr., Salisbury, MD (US) 21801

( * ) Notice: Subject to any disclaimer, the term of this patent is extended or adjusted under 35 U.S.C. 154(b) by 0 days.

(21) Appl. No.: 09/747,662

(22) Filed: Dec. 26, 2000

Related U.S. Application Data

(62) Division of application No. 09/009,234, filed on Jan. 20, 1998, now Pat. No. 6,240,877.
(60) Provisional application No. 60/036,042, filed on Jan. 21, 1997.

(51) Int. Cl.$^7$ ............................................. A01K 45/00
(52) U.S. Cl. ....................................................... 119/6.8
(58) Field of Search ..................... 119/6.5–6.8; 99/532; 604/187, 188; 68/201; 606/222, 223

(56) References Cited

U.S. PATENT DOCUMENTS

| | | | |
|---|---|---|---|
| 4,040,388 A | 8/1977 | Miller | 119/1 |
| 4,458,630 A | 7/1984 | Sharma | 119/1 |
| 4,469,047 A | 9/1984 | Miller | 119/1 |
| 4,681,063 A | 7/1987 | Hebranjk | 119/1 |
| 4,903,635 A | 2/1990 | Hebrank | 119/1 |
| 5,056,464 A | 10/1991 | Lewis | 119/6.8 |
| 5,107,794 A | 4/1992 | Bounds, Jr. | 119/44 |
| 5,136,979 A | 8/1992 | Paul et al. | 119/6.8 |
| 5,158,038 A | 10/1992 | Sheeks et al. | 119/6.8 |
| 5,176,101 A | 1/1993 | Paul et al. | 119/6.8 |
| 5,247,903 A | 9/1993 | Bounds, Jr. | 119/44 |
| 5,807,304 A * | 9/1998 | Cockburn | 604/19 |
| 5,810,884 A * | 9/1998 | Kim | 606/213 |
| 5,853,394 A * | 12/1998 | Tolkoff et al. | 604/288.01 |
| 5,911,706 A * | 6/1999 | Estabrook et al. | 604/116 |
| 6,146,594 A * | 11/2000 | De Graaff et al. | 422/100 |

* cited by examiner

Primary Examiner—Thomas Price
(74) Attorney, Agent, or Firm—Joseph P. Katrick, Esq.

(57) ABSTRACT

An apparatus for injecting fluid substances into eggs is disclosed, comprising a plurality of injectors, needles disposed within each of the injectors moveable between a retracted position and an extended injecting position with respect to the injectors, and a bridge assembly for positioning the injectors in alignment with a corresponding plurality of eggs in an egg flat. The injectors rest substantially vertically in openings in a horizontal plate. The openings in the plate are slightly larger than the cross-section of the injectors for permitting the injectors to move vertically within the openings in the plate with respect to the plate. An egg nesting cup is pivotally secured to the lower end of each injector. The injectors are lowered to engage the eggs. When the plate and the injectors are lowered the nesting cups seat against the eggs and the injectors move vertically upward with respect to the plate. A second plate adjacent and moveable relative to the first plate, having openings corresponding to the openings in the first plate, secures the injectors in place on the eggs. The needles then advance into the eggs. The relationship defined, by the seated position of the articulating cup against the shell of an egg and the injecting position of the needle is consistently reproducible so that the penetration and injection location of the needle within an egg is consistent regardless of the size and orientation of the egg. A needle for use in the injectors includes a beveled, solid tip and a radial opening adjacent the tip for both penetration of the egg shell and delivery of fluid. A fluid delivery assembly gently pulses fluid substance through the needles and into the eggs.

5 Claims, 23 Drawing Sheets

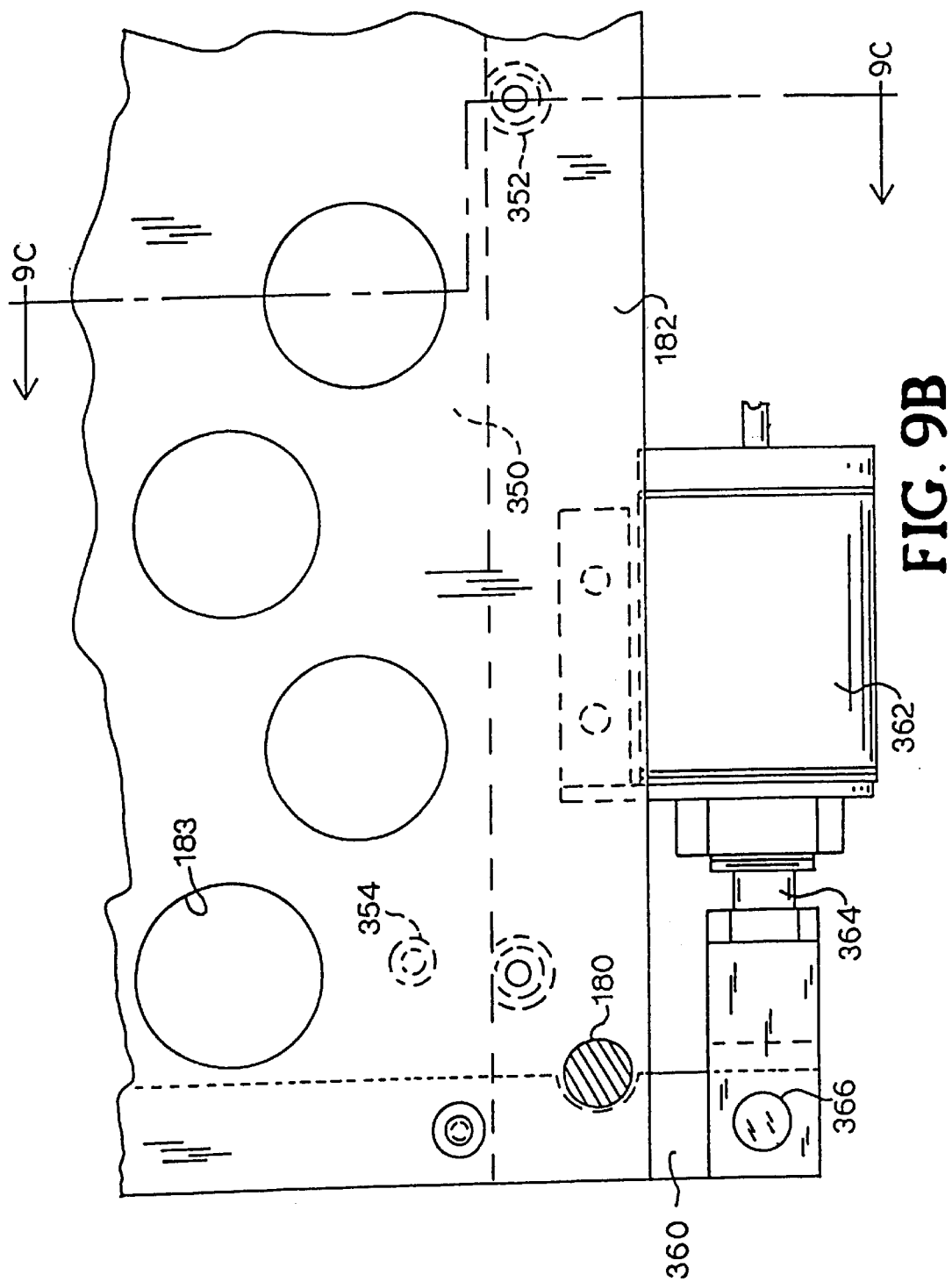

EGG INJECTION APPARATUS AND METHOD

CROSS REFERENCES

This application claims the benefit of U.S. Provisional Application No. 60/036,042, filed Jan. 21, 1997 and U.S. patent application No. 09/009,234, filed Jan. 20, 1998, the contents of which are hereby incorporated by reference. This Application is a divisional application of U.S. patent application No. 09/009,234 filed Jan. 20, 1998 now U.S. Pat. No. 6,240,877.

BACKGROUND

This invention relates generally to the injection of eggs, referred to as "in ovo" injection, and more particularly concerns an apparatus and method for the automated injection of various substances into eggs, especially for the control of disease in avian flocks.

There are a number of reasons in the fields of both medicine and poultry husbandry, among others, for the injection of a range of substances into various types of eggs. For example, in the field of medicine, fertile, or embryonated, eggs are used to incubate and harvest biologicals which have medical applications, such as certain vaccines. Eggs provide an appropriate environment for the growth of the vaccines.

Another reason for the injection of eggs is to add substances to the embryo or to the environment around the embryo. The purpose is to induce beneficial effects in the subsequently hatched chicks. The substances which may be added include antimicrobials such as antibiotics, bactericides and sulfonamides; vitamins; enzymes; nutrients; organic salts; hormones; adjuvants; immune stimulators and vaccines. This technique can, for example, lead to an increased percentage of hatch. The chicks from eggs that are injected prior to hatch may retain a sufficient amount of the injected substance so there is no need to inject the hatched bird. The chicks may grow faster and larger and experience improvement in other physical characteristics.

In ovo injection has also proven effective as a means for disease prevention. A significant problem in the poultry industry is a high incidence of infectious diseases which increases the cull rate and causes a high rate of mortality during the growing stage of young birds. An example is Marek's disease, which is a widespread herpes virus-induced lymphoproliferative disease of chickens. It is standard practice in commercial hatchery operations to immunize birds post-hatch against diseases like Marek's prior to placing them in brooder houses. This is a very labor-intensive process. With the advent of in ovo injection, certain types of vaccination, such as Marek's, which in the past had been carried out on hatched poultry are now successfully performed on embryonated eggs.

In general, the in ovo injection technique involves delivering a substance in fluid form to the interior of an egg using a needle. Occasionally, the needle is used to both penetrate the egg shell and deliver the fluid substances. However, fine needles, which are preferred when precise fluid delivery is required, may not be rigid enough to penetrate an egg shell. On the other hand, needles large enough and rigid enough to penetrate the egg shell may not provide suitable fluid delivery, both in terms of location and amount, which more delicate needles can provide. Furthermore, the penetrating process quickly dulls or plugs the needle. Therefore, a drill or punch is typically used to make a hole in the egg. Once the drill or punch has penetrated the egg shell, the needle is inserted into the interior of the egg for delivering the fluid substance.

An important parameter in in ovo injection is the location of the needle injection port within the egg at the time of fluid injection. Eggs are comprised of a brittle exterior shell and two flexible interior membranes. An outer membrane adheres to the interior of the shell and an inner membrane encases the fluid contents of the egg, including the allantois, amnion and yolk sac. At the time the egg is first laid, the two membranes are substantially coextensive. However, as the fertile egg is incubated, the inner membrane separates from the outer membrane, thereby forming an air cell between the two membranes, usually at the large end of the egg.

The egg can be injected at any location, and even into the embryo itself. The suitability of a particular location depends on the purpose for which the egg is being injected and the fluid substance delivered; since some substances must be delivered to a particular location within the egg in order to be effective. The problem with locating the needle at the appropriate injection point is that eggs vary in size. The resulting differences in distance between the shell and the location at which delivery of the fluid substance is desired complicates the task of consistently locating the injection point.

The amount of fluid delivered is also an important parameter. Typically, it is necessary that a sufficient amount of fluid be introduced into the egg to produce the desired effect, For example, in the case of bactericides, the amount of material introduced into the eggs must be sufficiently great to cause an appreciable increase in the percentage, of hatch, but must not be so great that it kills or injures the embryos.

Automated apparatus and methods for injecting eggs are available. Generally, in such devices the eggs are brought under a bank of injectors housing needles and punches. First, the punches open a hole in the shell. Then the needle is inserted into the egg, followed by injection of fluid. A primary goal of automated in ovo injection is to be able to handle a high egg volume in a short period of time while consistently maintaining the amount and location of the fluid substance delivered within each of the eggs.

An automated device for injecting eggs must address the fact that eggs are not identical in size. Some devices include means for permitting vertical travel of the injectors relative to the apparatus to accommodate eggs of different sizes. However, another problem related to "in ovo" injection in commercial hatcheries is that the eggs are typically carried in setting trays, or "egg flats." Conventional egg flats comprise anywhere from 36 to 168 depressions for receiving the smaller end of the egg. Because the depressions are designed to accommodate the varying sizes of eggs, the eggs are free to wobble in the depression. As a result, the eggs may be slightly tilted with respect to the injectors. The capacity to accurately and precisely control the travel of a needle within the egg is diminished when the egg is tilted, even where the relative vertical travel between the egg and the needle is carefully controlled to account for differences in egg height.

Methods for dealing with the tilted eggs include lifting the eggs free of the flat in a suction cup integral with the injector to properly orient the eggs with respect to the needles or allowing the injectors to translate through an arc to properly orient the injectors to the tilted eggs. The former is impractical and has never seen commercial application. The latter method is somewhat effective, but can fail in practice when an injector translates improperly, becoming so angled with respect to an egg that the needle will glance off the egg shell, completely missing the egg. Therefore, fluid delivery location still remains a problem for automated in ovo injection devices.

Another problem with existing in ovo injection machines is that the pump mechanisms for delivering the substances may produce excessive sheer and compressive forces on the substance. In the case of Marek's disease vaccine, which is commonly presented as a whole-cell suspension, these forces can rupture the cells and thereby render the vaccine virus inside the cells much less effective.

Another consideration in egg injection is that it must be done in as clean an environment as is possible so that there is reduced probability of bacteria or mold entering the egg during or after puncture. Since the same needle is used repetitively, there exists the possibility of cross-contamination. Accordingly, the needle must be sanitized periodically. The magnitude of this problem is exacerbated in the automated apparatus where the same needle is used to inject hundreds of eggs.

For the foregoing reasons there is a need for an automated egg injection apparatus and method which is less labor-intensive than known systems. The apparatus should handle a high volume of eggs with a high level of precision with respect to both the location and quantity delivered. Ideally, the injection needle should be capable of functioning as both the penetrating and fluid delivery means. Fluid delivery should be gentle and precise so as not to damage live vaccine cells. The overall operation should be sanitary so as to minimize, if not eliminate, cross-contamination. The machine design should facilitate both manufacture and operation, thus reducing manufacturing and operating costs as compared to known devices and methods.

SUMMARY

The present invention comprises an apparatus and method for in ovo injection that satisfies these needs.

An apparatus for injecting fluid substances into eggs, having features of the present invention, comprises a plurality of injectors, disposed within each of the injectors are needles moveable between a retracted position and an extended injecting position with respect to the injectors; means for positioning the plurality of injectors in alignment with a corresponding plurality of eggs; means for advancing the injectors into engagement with the eggs; means for advancing the needles from the retracted position to the extended position into the eggs; means for producing pulses of fluid substance through the needles; and means for retracting the needles from the eggs.

A feature of the egg injection apparatus is an injection assembly comprising one or more substantially horizontally-oriented plates with openings therethrough for holding the injectors substantially vertically in the openings in the plates, a lower portion of the injector depending downwardly below the plates and an upper portion of the injector resting at or above the plates. The openings in the plates are slightly larger than the cross-section of the injectors for permitting the injectors to move vertically within the openings in the plates with respect to the plates. An egg nesting cup is pivotally secured to the lower end of each injector. Means for raising and lowering the plates and the injectors are provided so that when the plates are lowered and the lower portion of the injector contacts an egg to be injected, the nesting cup seats against the egg and, while the plates proceed downwardly, the injector moves vertically upward with respect to the plate and the nesting cup is free to move independently of the injector body to seat around the egg. One of the plates may be horizontally moveable relative to the other plates after the plates have reached the limit of their downward movement for securing the injectors against movement.

An injector for use with an egg injecting apparatus is also provided, comprising an injector body, a needle disposed within the injector body, the needle moveable between a retracted position and an extended injecting position with respect to the injector body, an articulating cup pivotally secured to the end of the injector body, the articulating cup adapted for receiving the upper portions of the eggs, means for driving needle into the egg with sufficient force to pierce the egg shell, means for supplying fluid to the needle for delivery into the eggs after penetration to a predetermined distance, and means for retracting the needle from the egg. The relationship defined by the seated position of the articulating cup against the shell of an egg and the injecting position of the needle is consistently reproducible so that the penetration and injection location of the needle within an egg is consistent regardless of the size and orientation of the egg. A fastener pivotally secures the cup to the injector, the fastener having a sanitizing fluid reservoir defined by an annular recess at the upper end of the fastener.

A needle for use in the injector comprises a beveled, solid tip for penetration of the egg shell, and a radial opening adjacent the tip for delivery of fluid. The needle tip may be coated with titanium and beveled at an angle of from about 20 degrees to about 45 degrees.

Fluid delivery is accomplished via a pressurized fluid source, tubing carrying fluid from the pressurized fluid source to the needle, a first contacting member adapted to be rigidly connected to the egg injection apparatus and a second contacting member reciprocally connected to the first contacting member, wherein the tubing passes between the members for pinching the tubing closed when the contacting members are together and allowing fluid to flow through the tubing when the contacting members are apart. The volume of fluid delivered is controlled by the fluid pressure and the amount of time the contacting members are apart.

A spray assembly for applying sanitizing solution to the injectors and needles is provided, comprising a pan, a spray shield extending upwardly from the sides of the pan, the spray shield adapted to receive the injector assembly of the egg injection device, a plurality of spray nozzles in the pan, means for supplying sanitizing fluid to the spray nozzles, and means for moving the spray nozzles back and forth across the pan during spraying for uniform coverage of the injector assembly.

A method for injecting fluid substances into eggs having features of the present invention comprises providing an injectable fluid substance, arranging a plurality of eggs in an egg flat, placing the egg flat containing eggs into an egg-receiving assembly in alignment with a plurality of injectors, each of the injectors housing a fluid delivery needle, vertically aligning the beveled delivery tip of each needle with an egg, positioning a plurality of injectors, including an articulating cup, in seating relation against portions of the shell of each egg, initiating vertical needle movement, moving the needle between a retracted position and an extended position with respect to the cup, the extended position piercing the egg through the shell and defining an injecting position within the egg, delivering a predetermined amount of fluid at the end of the needle stroke through the needle into the egg in measured amounts; and withdrawing the needles from the eggs.

The method may further comprise the step of positioning the injectors in a sanitizing shower following the step of injection and extending and retracting the delivery tips of the needles at least once during the sterilizing shower, and then repeating steps above.

Accordingly, it is an object of the present invention to provide a new apparatus and method for in ovo injection having one or more of the novel features of this invention as set forth above or hereinafter shown or described.

Similarly an object of this invention is to provide an automated apparatus and method for in ovo injection which is capable of injecting a high volume of eggs in a short time period.

It is an object of this invention to provide for the control of disease in avian flocks. Therefore, in one of its aspects, it is an object of this invention to inject beneficial substances into the embryo or to the environment around the embryo to improve the hatch rate and to induce beneficial effects in the subsequently-hatched chicks.

Another object of this invention is to provide a needle for use in in ovo injection which is sufficiently rigid and durable to repeatedly penetrate an egg shell and which provides appropriate substance delivery location and amount.

Still another object of this invention is to provide an in ovo injection apparatus and method for consistently and accurately controlling the location of the substance delivery needle at a predetermined injection point in the egg, regardless of the size of the egg or the tilt of the egg when in a conventional egg flat.

Further, an object of this invention is to so control the amount of material injected so as to provide the maximum amount of beneficial substances without damage.

Yet another object of this invention is provide gentle delivery of fluid substances to minimize damage to whole-cell suspensions, such as Marek's vaccine.

A still further object of this invention is to provide an in ovo injection apparatus and method which reduces labor and minimizes manufacturing and operation costs.

Finally, an object of this invention is to provide for a sterile environment for in ovo injection so as to minimize cross-contamination.

The apparatus of the present invention provides a method for automatically injecting eggs with a desired fluid at a predetermined location within the egg. The vertically-movable injector further including an egg nesting cup accommodates the varying sizes of eggs and the slight tilt encountered with respect to vertical due to the design of egg flats. The injector is positioned with respect to the egg so that the same injection location is achieved despite the size and orientation of the egg. The present invention is capable of accurately controlling the travel of the needle within the egg. A solid-tipped needle can be used for egg shell penetration and injection thereby eliminating the need for a separate punch. Radial outlet ports on the needle prevent direct fluid impingement on the embryo. The preferred fluid delivery method also eliminates the pumping of fluids through conventional fluid-handling systems and offers both precise and cell-safe fluid delivery. Few live cells are destroyed in the delivery, ensuring that an effective quantity of vaccine titer reaches the egg. A clean injection environment is maintained since all egg contacting surfaces are sanitized after each injection cycle. This minimizes the potential for cross-contamination of the eggs. The egg injection apparatus of the present invention is simple to manufacture and operate. Labor is reduced from known methods and devices while at the same time improving output.

BRIEF DESCRIPTION OF THE DRAWINGS

For a more complete understanding of this invention reference should now be had to the embodiments illustrated in greater detail in the accompanying drawings and described below.

In the drawings:

FIGS. 9A, 9B and 9C are partial side elevation, rear and top views, respectively, of tooling plates, a gripper plate and air cylinder for use in the present invention;

DESCRIPTION

The term "birds," as used herein, is intended to include males or females of avian species, but is primarily intended to encompass poultry which are commercially raised for eggs or meat, or to breed to produce stock for eggs or meat. Accordingly, the term "bird" is particularly intended to encompass either gender of any bird, including without limitation, chickens, ducks, turkeys, geese, quail, ostriches, pheasants, and the like. The present invention may be practiced with any type of bird egg.

The term "fluid," as used herein, is intended to include any material which will flow and is not limited to pure liquids. Thus, "fluid" refers to solutions, liquid-liquid suspensions, liquid-solid suspensions, gases, gaseous suspensions, emulsions, and any other material or mixture of materials which exhibits fluid properties. Certain solid materials also fall under this term, such as biodegradable polymers (e.g., in the form of syringeable beads) which release active agents upon biodegradation.

Figure 1:
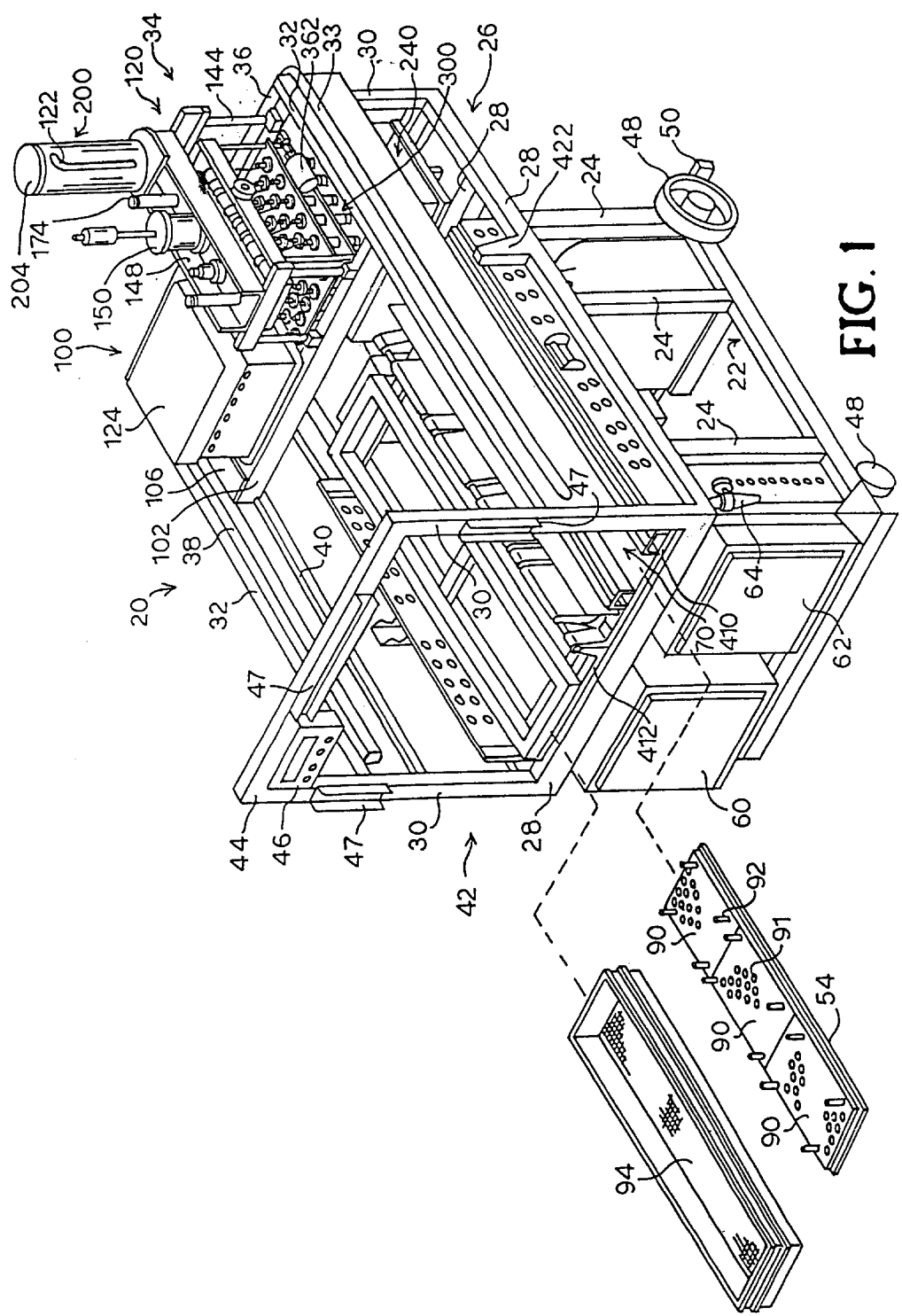
FIG. 1 is a perspective view of an embodiment of the egg injection apparatus of the present invention.

An egg injection apparatus embodying features of the present invention is shown in FIG. 1, and denoted generally by the numeral 20. A structural base unit 22, having a front end 34 and a rear end 42, provides support and strength to the apparatus 20. The base unit 22 includes a plurality of upright leg members 24. The upright leg members 24 support a rectangular horizontal bracket assembly 26 comprised of strut members 28. Extending upwardly from the corners of the horizontal bracket assembly 26 are upright support members 30. The upright support members 30 support U-shaped linear shaft mounts 32 on each side of the base unit 22. Horizontally mounted on the inboard side of each of the linear shaft mounts 32 is a lower cylindrical linear shaft 40 which extends the length of the linear shaft mounts 32. As seen in FIG. 1, a second upper, linear shaft 38, which is above and parallel to the cylindrical linear shaft 40, is carried by the far linear shaft mount 32. The second linear shaft 38 comprises a double-acting rodless servopneumatic cylinder. A rubber bumper 33 is mounted on the outside of the linear shaft mounts 32 and wraps around the ends of the apparatus 20.

The upright support members 30 at the rear 42 of the base unit 22 extend upwardly and are joined at the top by an upper frame member 44 forming a rear control area. An operator works from the rear 42 of the apparatus 20. A control panel 46, including buttons, switches, visual liquid crystal display (LCD) and indicator lights, is provided on the rear upright support members 30 and upper frame member 44, as shown. Brackets 47 for additional control panels are available. The entire apparatus 20 is mounted on casters or wheels 48 so that it can be moved from place to place, as desired. A brake or floor lock 50 is provided to hold the apparatus 20 in place during operation.

Figure 2:
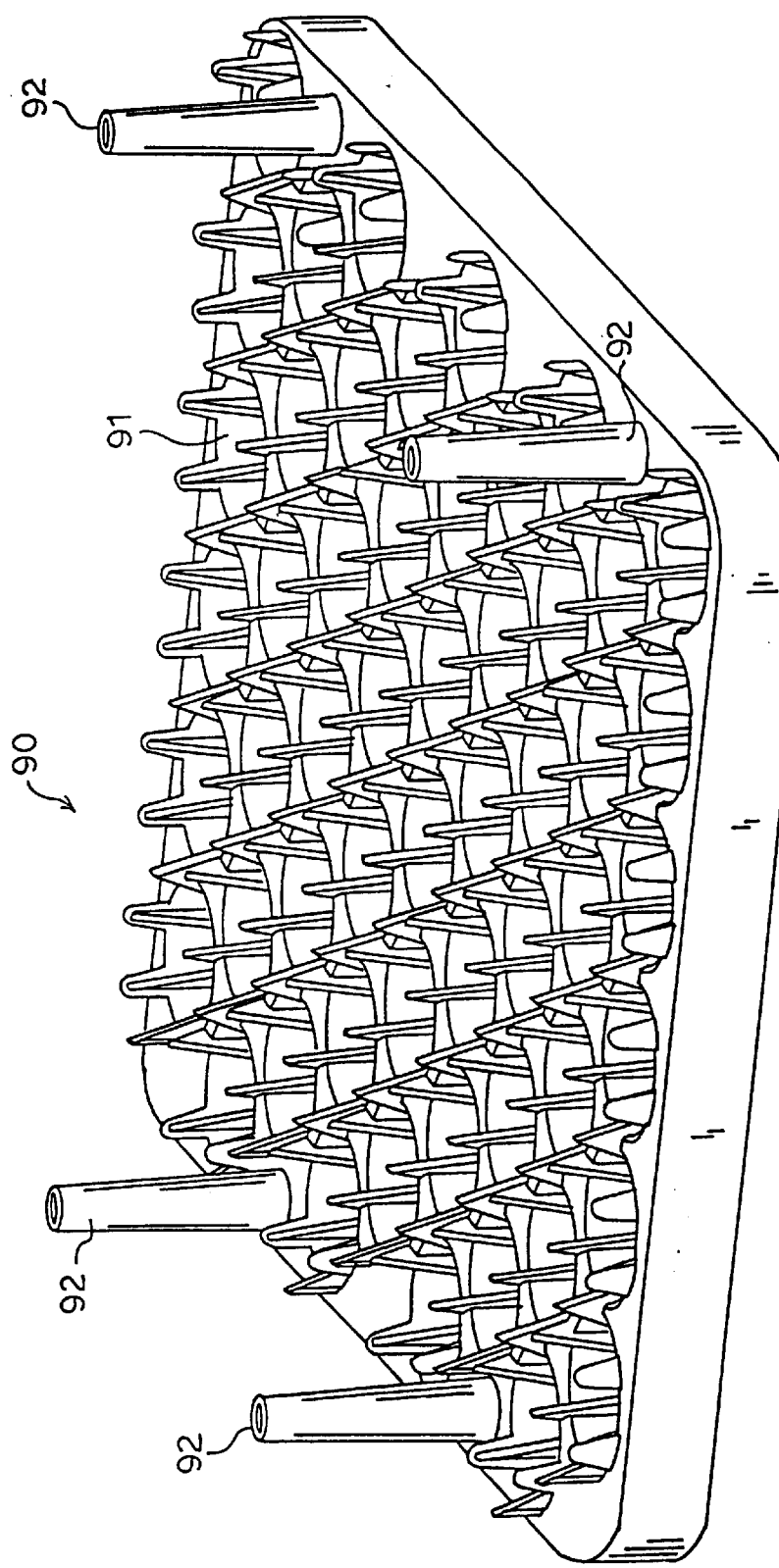
FIG. 2 is a perspective view of an egg flat.

A framework 70 (see also FIG. 4) for receiving eggs to be injected is mounted on the top portion of the horizontal bracket assembly 26. Preferably,, the framework 70 is designed to receive one or more conventional incubation egg flats used in commercial hatcheries. For example, FIG. 2 shows a "ChickMaster®54" egg flat 90 capable of holding fifty-four eggs in nine offset rows of six depressions 91 each. The flat 90 also includes several projections or spacers 92.

Returning to FIG. 1, the framework 70 is designed to receive a large egg pallet 54 that is capable of supporting three of the egg flats 90 shown in FIG. 2. Therefore, the egg pallet 54 shown in FIG. 1 accommodates three "ChickMaster®54" egg flats 90. The egg pallet 54 is sized to slide between longitudinal clamps on the framework 70 for securing the egg flats 90 in a predetermined position, as will be described further below.

A bridge assembly 100 is slidably mounted on the linear shafts 38, 40 above the egg receiving framework 70. In operation, a pressurized gas is supplied to the rodless servopneumatic air cylinder 38 for propelling the bridge assembly 100 back and forth along the air cylinder 38 and linear shafts 40 above the eggs.

An injection assembly 120 is carried on the bridge assembly 100. The injection assembly 120 comprises a vertically reciprocating bank of injectors 300. Each of the injectors 300 houses a reciprocating needle for supplying a fluid substance to the interior of the eggs. The number and location of the injectors 300 preferably correspond in number and location to the egg-holding depressions in each egg flat 90. This configuration allows injection of all of the eggs in a flat at one time.

Since the design of egg flats may vary, it is understood that any number of injectors 300 may be provided in the injection assembly 120 as long as the injectors are arranged so as to correspond to the locations of the egg-holding depressions 91 in a particular egg flat 90. For example, some one-piece egg flats hold as many as one hundred sixty eight eggs. When injecting such a large number of eggs in this type of egg flat, the injection assembly 120 could conveniently hold fifty six injectors 300 thus requiring three injection sequences to complete the flat. This type of large egg flat would not require the underlying egg pallet 54.

When an injection cycle is initiated, the bridge assembly 100 moves from a "home" position at the front 34 of the base unit 22 and rapidly traverses along the linear shafts 38, 40 to the rear 42 of the base unit 22 to a position directly over the first egg flat 90. The bridge assembly 100 stops when it is so positioned that each injector 300 is directly above one of the eggs in the flat 90. The bank of injectors 300 is then lowered so that the injectors contact the eggs.

Once the injectors 300 are seated on the eggs, the needles are extended a predetermined distance with sufficient force to penetrate the egg shell. The needles continue through the openings in the egg shells to an injecting position. Fluid is delivered to each egg via one or more radial outlet ports in each of the needles. Following fluid delivery, the needles retract and the injectors 300 are returned to their "up" position away from the eggs in the flat. The bridge assembly 100 moves to a position over the next egg flat for injection, and so on, until the eggs in the last egg flat have been injected. The bridge assembly 100 then returns to the "home" position adjacent the last egg flat.

Of course, the injection sequence can proceed in opposite fashion beginning with the eggs in the flat adjacent the "home" position of the bridge assembly 100, proceeding sequentially to the rear 42 of the base unit 22 and then returning to the "home" position. However, the former injection cycle with the injection sequence commencing at the rear 42 of the base unit 22 has been found to be faster.

Fluid substances to be injected, such as vaccines, are ordinarily provided in a closed, sterile plastic bag having ports (not shown), similar to an IV bag. The bag is suspended from a hanger 122 mounted on the injection assembly 120. The bag is housed in a pressurized chamber 200. Fluid delivery from the fluid bag to the needles is accomplished via flexible fluid delivery tubes. The fluid delivery tubes are not shown in the figures to avoid unnecessary complication. The routing and number of tubes is apparent from this description. All fluid delivery tubes between common points are substantially the same length so that there is no variation in internal fluid friction. Therefore, fluid is equally distributed to each individual injector 300 at substantially the same time. This allows for consistent delivery of the proper dosage of fluid to the eggs.

Figure 3:
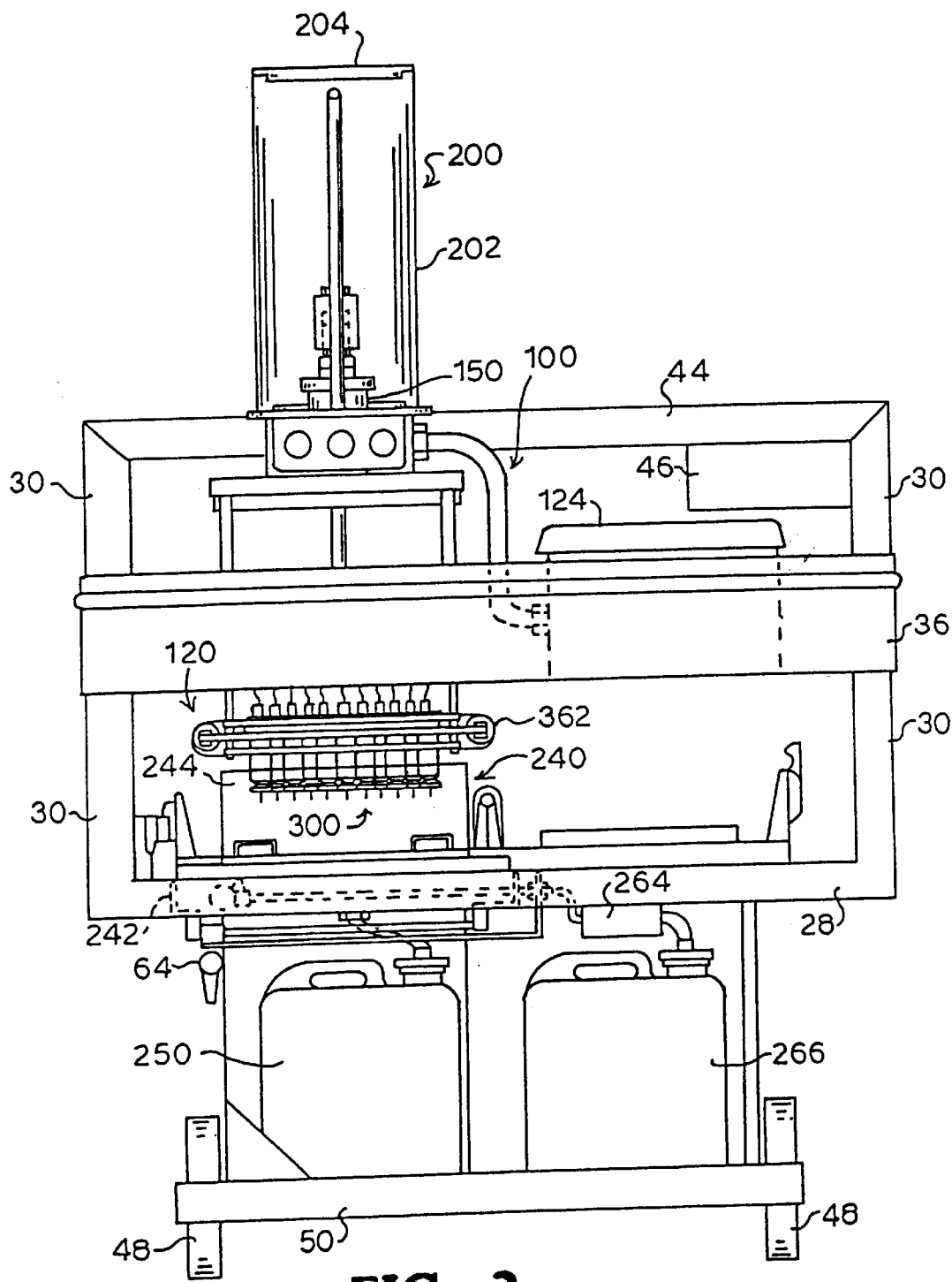
FIG. 3 is a front elevation view of the egg injection apparatus shown in FIG. 1.

The front 34 of the base unit 22 is shown in FIG. 3. The linear shaft mounts 32 (FIG. 1) are separated by a frame spreader member 36. A sanitization assembly 240 is mounted to the base unit 22. When the bridge assembly 100 is in the "home" position at the front 34 of the base unit 22, the injection assembly 120, with the injectors 300, is directly over the sanitization assembly 240. The sanitization assembly 240 comprises a spent fluids sump pan 242 and a spray shield 244. The spray shield 244 is secured to and extends upwardly from all sides of the sump pan 242 for preventing spray from leaving the sanitization assembly 240 area. The sump pan 242 includes a narrow drain channel having a drain outlet 248 which drains spent sanitizing fluid from the pan 242 and to a spent fluids reservoir 250 on the lower front of the base unit 22.

A spray manifold 252 (FIG. 3A) extends the length of the sump pan 242. A plurality of spray nozzles 256 are aligned along the top of the manifold 252. A sanitizing fluid supply pipe 258 is threaded into the side of the manifold and slidably extends through a hole 260 in the side of the sump pan 242. The end of the pipe 258 connects to a sanitizing fluid supply tube leading from a pump 264 (FIG. 3) secured to the base unit 22. The pump 264 pumps sanitizing fluid from a sanitizing fluid reservoir 266 on the lower front of the base unit 22 to the spray nozzles 256.

Figure 3A:
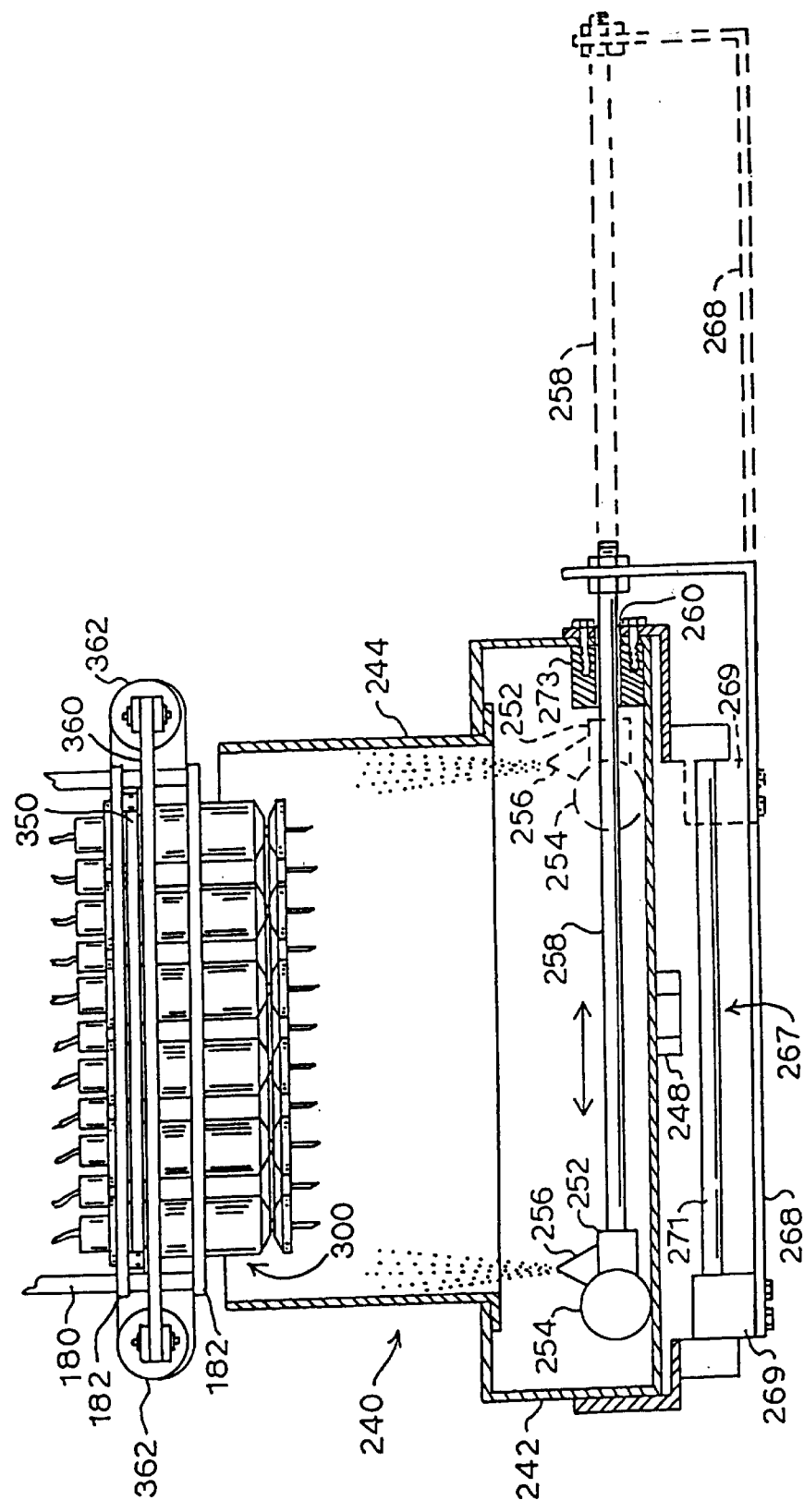
FIG. 3A is a front elevation cross-section view of the left side portion of FIG. 3 showing a sanitization assembly for use in the present invention.

Referring to FIG. 3A, the spray manifold 252 with spray nozzles 256 is shown, including caster wheels 254 on each end of the manifold 252. A sanitizing fluid supply pipe 258 is threaded into the side of the manifold and slidably extends through a hole 260 in the side of the sump pan 242. Means are provided for moving the spray manifold 252 back-and-forth across the sump pan 242. Specifically, a double-acting rodless air cylinder 267, including a carriage 269 and a linear slide 271, is mounted to the base unit beneath the sump pan 242. An L-shaped bracket 268 is provided, having one end secured to the carriage 269 of the rodless air cylinder 267. The other end of the bracket 268 is attached to the sanitizing fluid supply pipe 258.

Sanitization is performed between each injection cycle to minimize cross-contamination of the eggs. Spray sanitization is initiated when the bridge assembly 100 reaches the "home" position. The bank of injectors 300 is lowered until the injectors 300 are surrounded by the spray shield 244. The needles extend and the sanitizing fluid pump 264 is activated generating a v-shaped spray of sanitizing fluid, from each of the nozzles 256, which overlap to provide complete coverage of the bank of injectors 300. As the spray continues, the rodless air cylinder 267 moves the manifold 252 from a position on the left side of the sump pan 242, as seen in FIG. 3A, to the right side of the sump pan 242, as shown in dotted lines. When the manifold 252 reaches the right side of the sump pan 242, the needles retract and then re-extend. The air cylinder 267 then returns the manifold 252 to the left side of the sump pan 242, the spraying stops and the needles retract. A dwell time of at least about 10 seconds follows the stoppage of spray before the injection assembly 90 is allowed to commence another injection cycle, in order to allow adequate time for the sanitizing fluid to kill bacteria.

Along with a uniform spray pattern, a spray with sufficient force is preferred for dislodging solid matter which may be picked up from, for example, an exploded or broken egg. Multiple spray nozzles mounted in the bottom of the sump pan underneath the injectors may also be used. However, the preferred means described above affects more thorough coverage, especially towards the perimeters of the injectors.

After the sanitization sequence has been completed, the apparatus 20 is ready for another injection cycle. A new set of egg flats has, by this time, been placed in the framework 70 by the user, preferably during the sanitization sequence, and the injection cycle is repeated.

Each of the sub-parts of the apparatus 20 of the present invention is described in more detail below. The scope of the invention is not intended to be limited by the materials listed here, but may be carried out using any material which allows the construction and operation of the apparatus described herein.

Preferably, a source of pressurized gas is used to drive the apparatus of the present invention. The pressurized gas is generally air or nitrogen, although for the purpose of this description it will be assumed that the pressurized gas is air. The bridge assembly 100, injector assembly 120, needles and sanitization assembly 240 movement are all carried out pneumatically. As seen in FIG. 1, electrical and pneumatic enclosures 60, 62 are mounted on the rear 42 lower portion of the base unit 22 for housing appropriate equipment. Air is supplied at an air supply inlet 64 mounted adjacent the exterior of the pneumatic enclosure 62. The air supply inlet 64 is connected to the source of pressurized air (not shown), such as instrument air, an air compressor or the like. From the air supply inlet 64, the pressurized inlet air initially passes through a series of air filters where the inlet air is filtered and most of the moisture and oil content removed. The clean dry air then flows through an air pressure regulator for controlling the operating pressure of the apparatus. The inlet air supply pressure is preferably from about 100 psi to about 120 psi. The inlet air supply pressure may be monitored by an air pressure switch (not shown) and visually indicated on an air pressure gauge (not shown).

On the side of the bridge assembly 100 adjacent the injector assembly 120 is an electropneumatic enclosure 124 for housing the electrical and pneumatic components required for operation of the bridge assembly 100 and injection assembly 120. A robotic cable carrier, such as an e-chain (not shown), may be provided for uncomplicated transition of the pneumatic and electrical lines from the electrical and pneumatic enclosures 60, 62 to the bridge assembly 100 and electropneumatic enclosure 124.

Air cylinders referred to herein, and their connection to the parts they move, are generally conventional in nature and will not be described in further detail other than to point out that the appropriate arrangements can be made without undue experimentation in manufacturing or operating the device. It is understood that other devices, such as solenoids, could be used in the present invention, but single or double-acting fluid driven pneumatic cylinders are preferable since egg injection machines are typically washed down after each use.

The egg injection apparatus 20 is controlled by an onboard computer or central programmable logic controller (PLC). The programming of the operation of the egg injection apparatus 20 is easily accomplished form the logical operation of the apparatus as described herein. The PLC controls the normal operation of the unit. The operation of the pneumatic cylinders, pneumatic control valves, operator interface, LCD, indicator lights, buttons and switches are all controlled by the PLC. Sensors for air pressure and fluid levels may also be provided. Proximity sensors selectively mounted at various points on the apparatus signal the position of the moving parts of the apparatus to the PLC for various machine functions.

Figure 4:
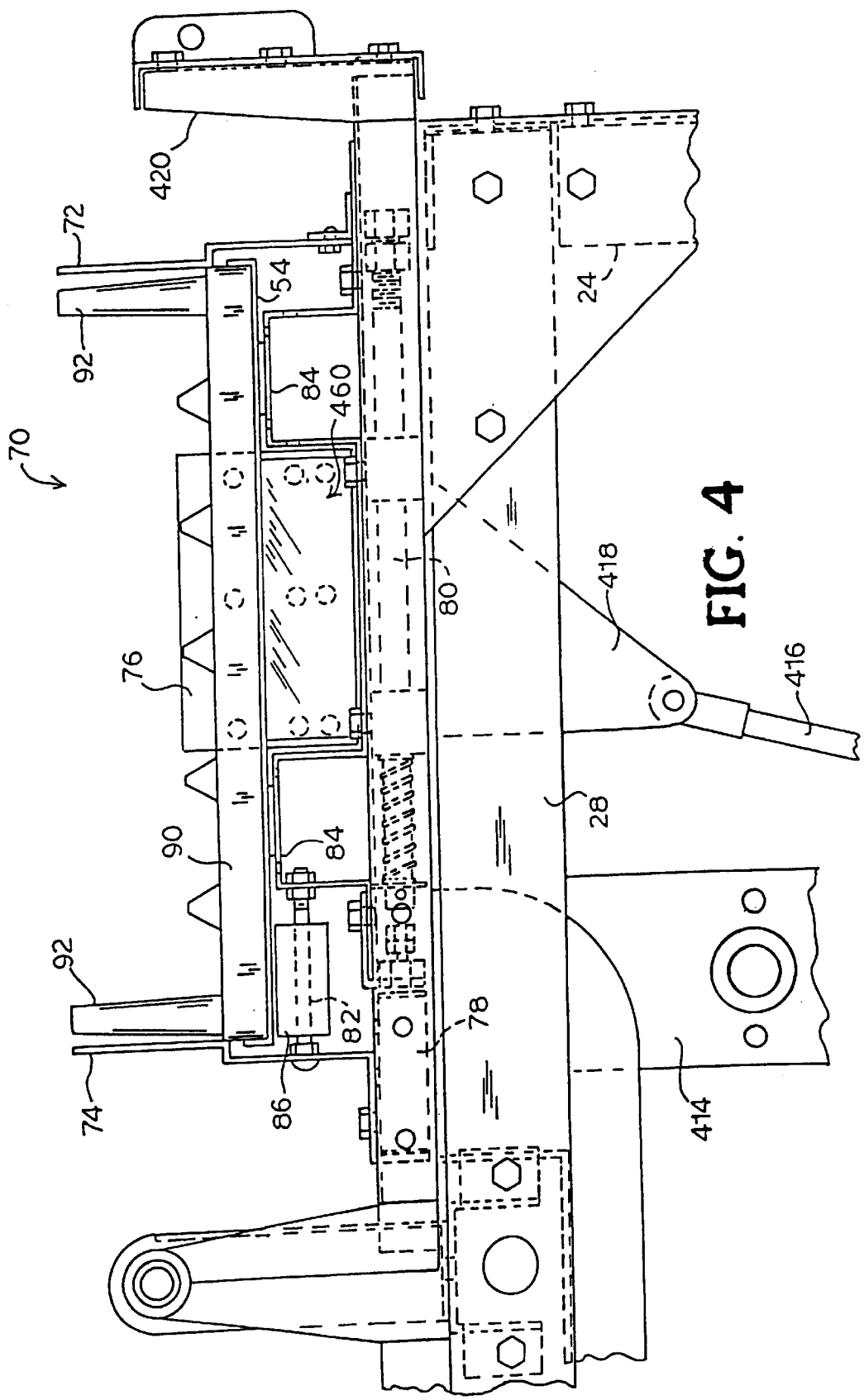
FIG. 4 is a rear elevation view of the left rear portion of the egg injection apparatus shown in FIG. 1 with an egg pallet and egg flat in place wherein background items are removed for clarity.

A suitable egg-receiving framework 70 for use in the present invention has been previously described by the applicant in his U.S. Pat. Nos. 5,107,794 and 5,247,903, issuing Apr. 29, 1992 and Sep. 28, 1993, respectively, the contents of which are hereby incorporated by reference. As seen in FIG. 4, the apparatus for use in the present invention is nearly identical to that shown in the patents, with modifications for making an egg flat clamp moveable for holding the egg pallet 54 and egg flats securely in place and an automatic start mechanism. The egg flat clamps comprise an outer active clamp 72, an inner passive clamp 74 and flanking saddle members 84 which support the egg pallet 54 and egg flats 90. Air cylinders 78 are provided for reciprocating one or more push rods 80 secured to the active clamp 72 for moving the active clamp 72 inwardly against the egg pallet 54 and egg flats 90 to grip them. ine adjustment for properly securing egg flats of different widths is provided for using screws 82 passing through the passive clamp 74 and the adjacent saddle member 84. This allows the distance between the passive clamp 74 and the saddle member 84 to be changed. A roller 86 may be provided on the screws 82, especially for ChickMaster®& egg flats, to support the portion of the egg flats 90 and egg pallet 54 which overhang the saddle member 84. Thus, the preferred framework 70 is able to accommodate all conventional egg flats.

The automatic start mechanism 460 is visible between the saddle members 84. The automatic start mechanism (FIG. 4A) includes a contact plate 462 and a spring-loaded plunger 464. The contact plate 462 is pivotally-mounted to a bracket 466 fixed to the egg receiving framework 70 between the saddle members 84 and adjacent an end stop member 76. The plunger 464 fits vertically through a hole in the bracket 466. A nylon cap nut 468 is threaded onto the upper end of the plunger 464 and engages the underside of the contact plate 462. A spring 470 is positioned between the cap nut 468 and the bracket 466 for biasing the plunger 464 and the contact plate 462 upward. The lower end of the plunger 464 fits slidably through a guide sleeve 472 positioned against the lower surface of the egg receiving framework 70. A radial pin 474, extending through the plunger 464, defines the maximum upward extension of the plunger 464. A proximity sensor 476 is mounted to a strut member 28 adjacent the lower end of the plunger 464 for sensing the plunger end when the plunger 464 is depressed.

Figure 4A:
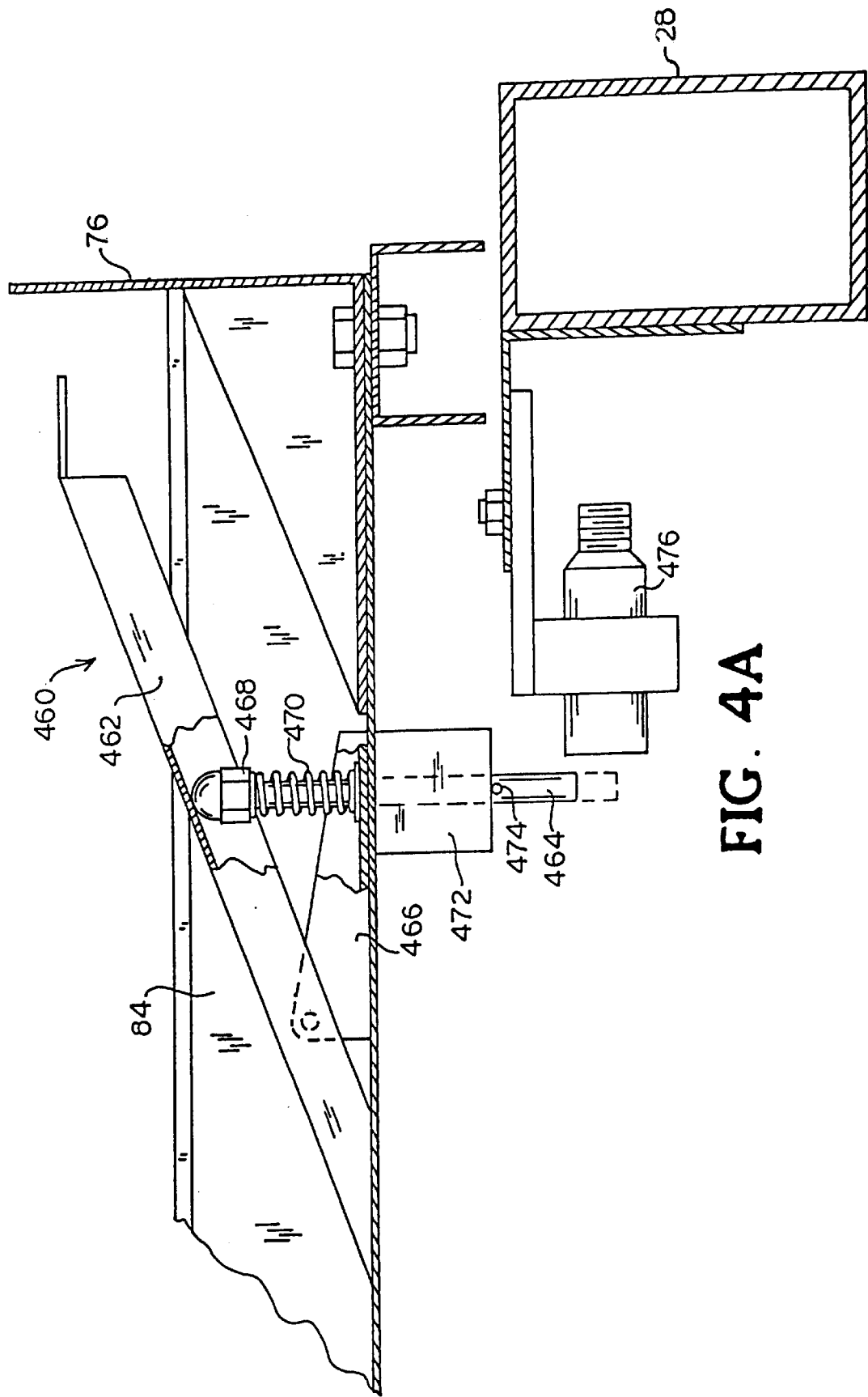
FIG. 4A is an elevation view showing an automatic start mechanism partially in cross-section.

Initially, the active clamp 72 (FIG. 4) is in an outermost position to accept the egg pallet 54 bearing the flats 90. The egg pallet 54 is pushed forward supporting the egg flats 90 until the forward-most egg flat contacts the end stop member 76 and all of the egg flats are tightly aligned end-to-end. Sliding the pallet 54 in place also pivots the contact plate 462 in a clockwise direction, as seen in FIG. 4A, driving the plunger 464 downward against the force of the spring 470. When the lower end of the plunger 464 is adjacent the proximity sensor 476, the proximity sensor signals the PLC to initiate the injection cycle. Upon initiation of the injection cycle, the active clamp 72 (FIG. 4) is drawn inwardly against the egg flats 90, securing the egg flats in a predetermined position with respect to the injection assembly 120. As an alternative to the automatic start mechanism, a manual start button may be provided on the rear control panel 46 for actuation when the egg pallet 54 is in place against the end stop member 76.

Figure 5:
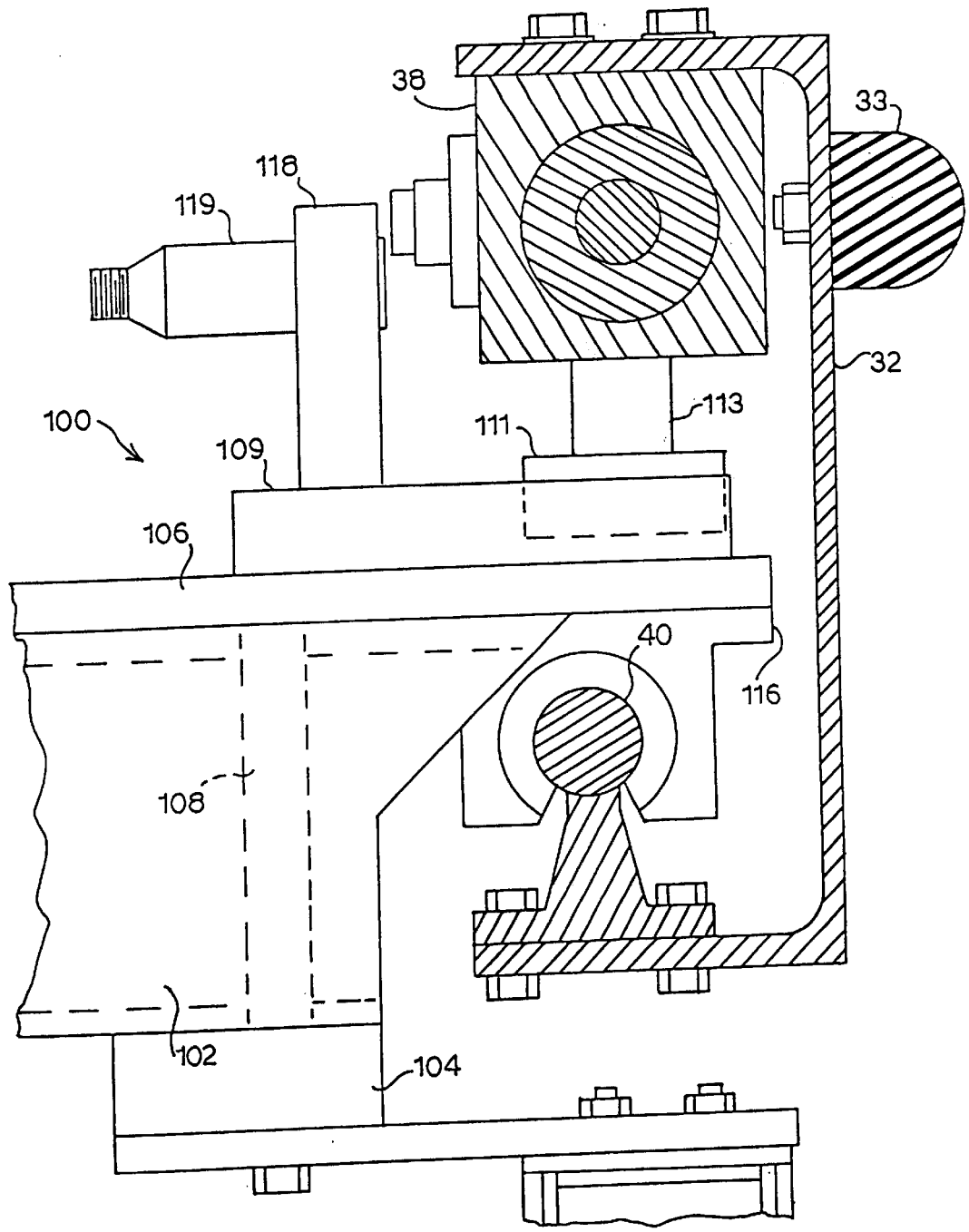
FIG. 5 is an elevation view in cross-section of the right portion of the bridge assembly and right linear shaft mount.
Figure 5A:
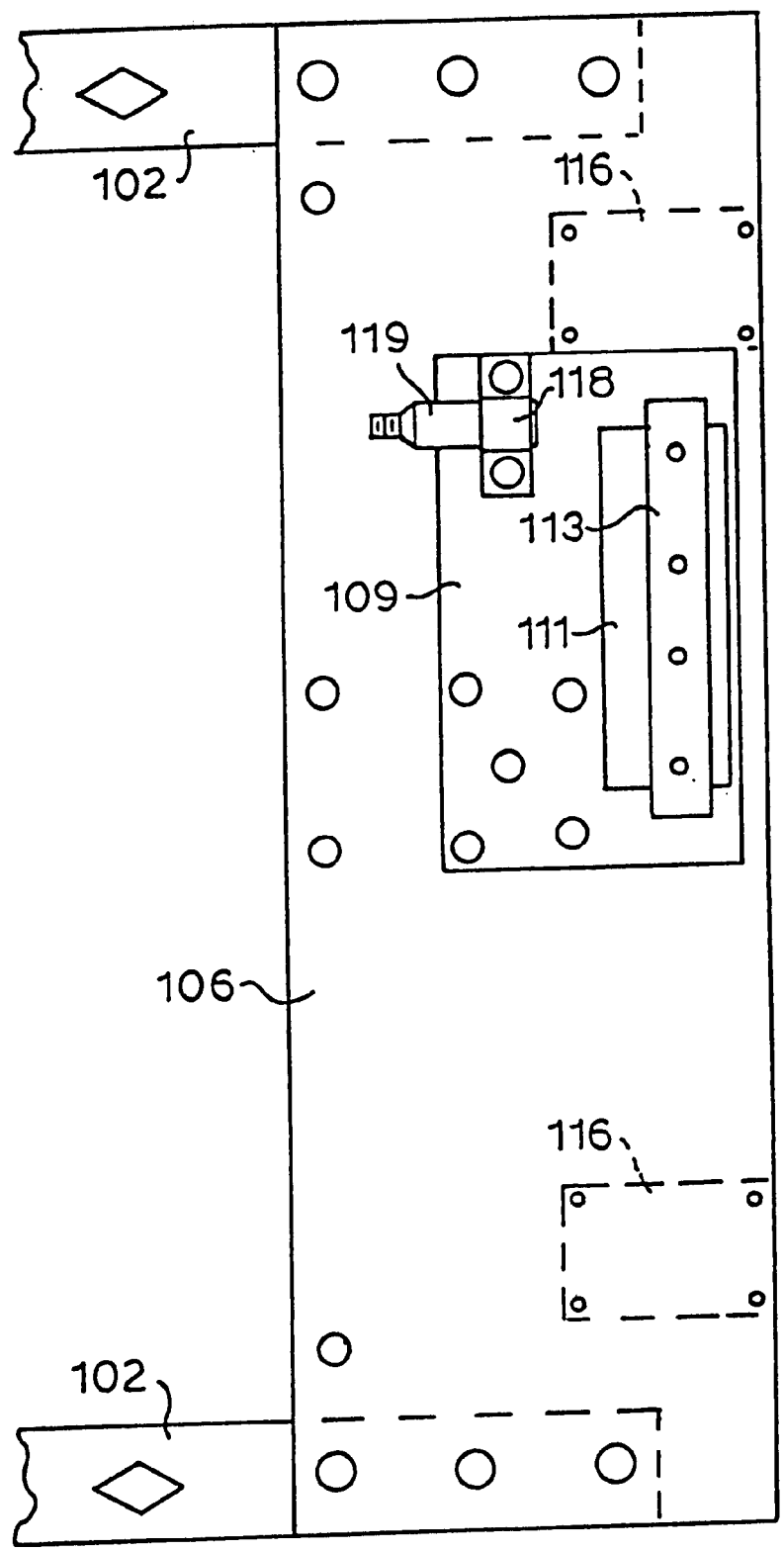
FIG. 5A is a top plan view of the bridge transition plate of FIG. 5.

Turning now to FIGS. 5 and 5A, there is shown an elevation view in cross-section and a top plan view, respectively, of the right portion of the bridge assembly 100. The bridge assembly 100 comprises two spaced, parallel horizontal cross members 102 which are secured to one another at their bottom ends by bridge stabilizer plates 104. Spanning the top ends of the horizontal cross members 102 are bridge transition plates 106 which extend beyond the ends of the horizontal cross members 102. A bridge stiffener 108 is secured between the stabilizer plates 104 and the transition plates 106. The bridge assembly 100 is positioned between the linear shaft mounts 32 so that the bridge transition plates 106 are above and parallel to the lower linear shafts 40. Mounted on the front and rear bottom of the bridge transition plates 106 are linear bearing pillow blocks 116 which ride on the lower linear shafts 40. The bridge transition plate 106 carries a floating riser 111 in a retaining yoke 109 for attaching to the servopneumatic air cylinder 38 carriage 113 (FIG. 5A).

A servopneumatic linear drive serves as a positioning means for the bridge assembly 100. The servopneumatic drive conventionally includes a linear encoder embedded in the rodless air cylinder barrel 38. As the piston (not shown) moves in either direction, the linear encoder signals the position of the bridge assembly 100 to an electronic controller. The controller compares the actual cylinder position with setpoint values and sends an electronic signal to a servopneumatic valve. The servopneumatic valve regulates the flow of air to the cylinder 38 in direct proportion to the electronic signal received from the controller. The controller is programmed to stop the bridge assembly at predetermined points along the linear shaft mounts 32 positioning the injection assembly 120 so that each injector 300 is directly over an egg. When the eggs in the last egg flat are injected, the linear encoder signals the controller to return the bridge assembly 100 to the "home" position. A suitable servopneurnatic rodless air cylinder and drive for use with the present invention are available from Festo Corporation of Hauppauge, N.Y., U.S.A. A proximity sensor 119 is mounted in a bracket 118 on the bridge transition plate 106 and serves as a back-up for the linear drive.

Figure 6:
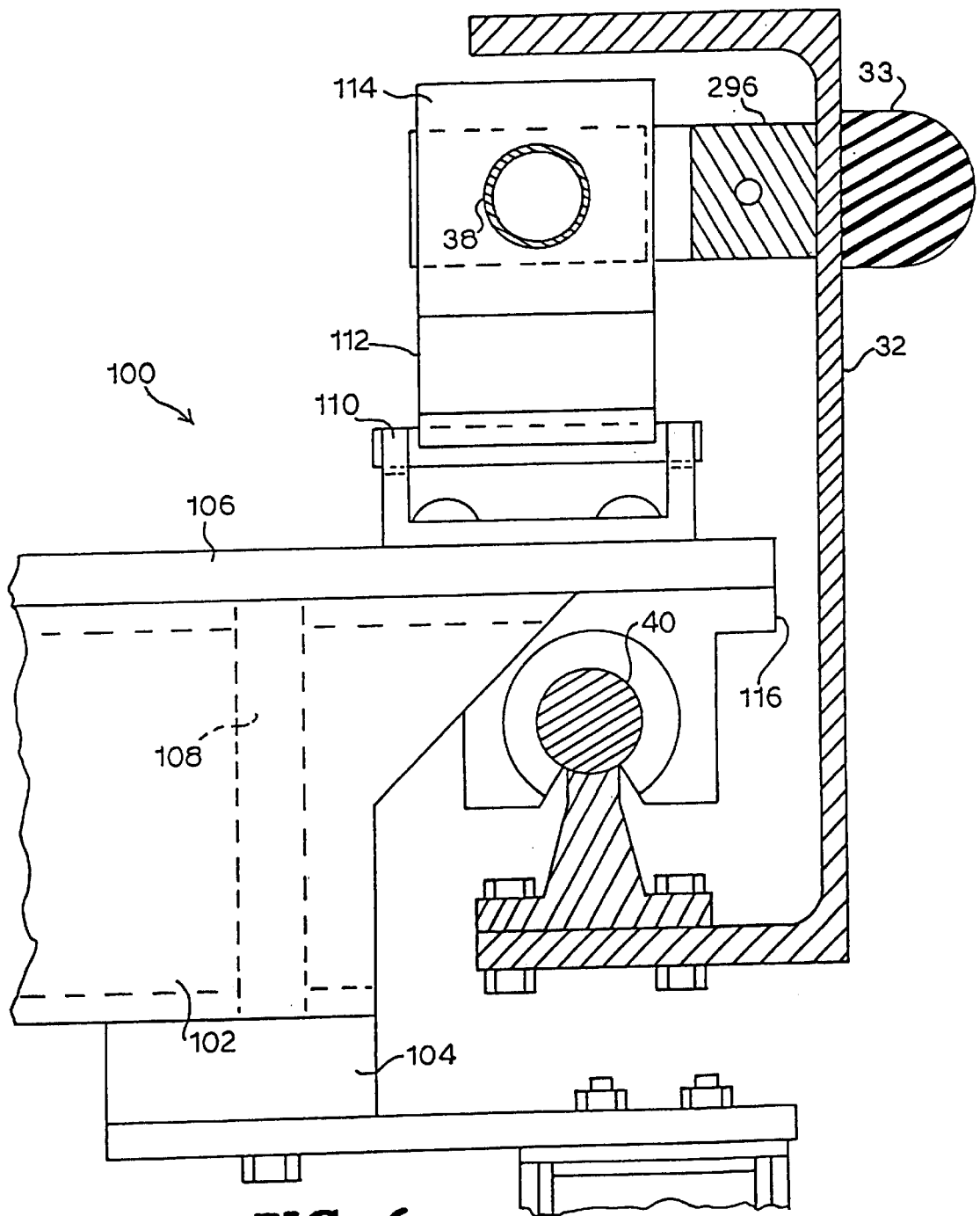
FIG. 6 is an elevation view in cross-section of the a second embodiment of the right portion of the bridge assembly and right linear shaft mount.
Figure 6A:
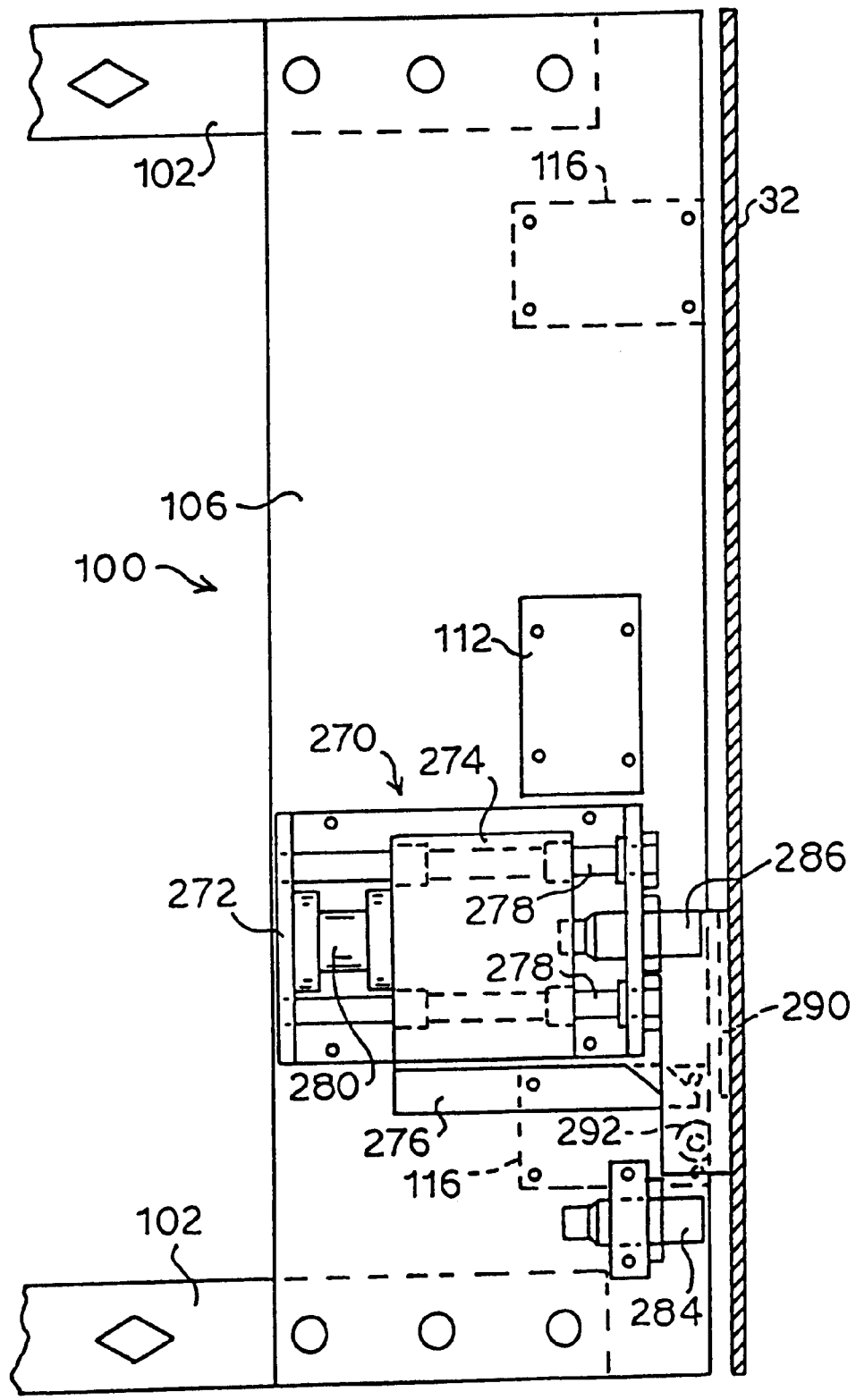
FIG. 6A is a top plan view of a bridge transition plate of FIG. 6.

An elevation view in cross-section and a top plan view of the right portion of the bridge assembly of another embodiment of the bridge drive mechanism is shown in FIGS. 6 and 6A, respectively. In this embodiment, upper linear shafts 38, comprising rodless air cylinders, are mounted parallel to the lower linear shafts 40 on both linear shaft mounts 32. The bridge transition plates 106 carry a floating mount 110 and riser 112 for attaching to the rodless air cylinder carriages 114.

Means are also provided in this embodiment for stopping the bridge assembly 100 at any point along the linear shafts 38, 40 directly over an egg flat 90. The locating means is shown in FIG. 6A and includes an index mechanism 270 secured to the top of each of the bridge transition plates 106. The index mechanism 270 comprises a saddle mount 272, an index carriage 274 and a strike bar 276. The saddle mount 272 is a U-shaped bracket secured to the bridge transition plate 106. The carriage 274 is a block which slides on two bearing shafts 278 mounted in parallel spaced relation across the upstanding legs of the saddle mount 272. An air cylinder 280 is fastened to the inner leg of the saddle mount 272, and the cylinder rod is connected to the carriage 274 to provide reciprocating movement to the carriage 274. The strike bar 276 is connected to the side of the carriage 274 and extends beyond the carriage 274. When the index carriage 274 is in an outermost position, the end of the strike bar 276 extends beyond the edge of the bridge transition plate 106.

The bridge transition plates 106 also carry two proximity sensors 284, 286. One of the proximity sensors 286 is positioned in a hole in the upstanding leg of the saddle mount 272. Metal plates, or "index flags," 290 are mounted on the inner surface of the linear shaft mounts 32 at each selected intermediate stop of the bridge assembly 100.

Adjacent each index flag 290 is a stationary cam roller 292 secured with a carriage bolt (not shown) in a T-slot which extends the length of each linear shaft mount 32 (FIG. 6A). The index flags 290 and cam rollers 292 can be positioned at any point along the linear shaft mounts 32 for exact positioning of the bridge assembly 100 at selected intermediate points along the linear shafts 32.

As the bridge assembly 100 approaches a pair of index flags 290, the first proximity sensors 284 sense the index flags 290 and send a signal to the PLC. The PLC reverses the air flow to the rodless air cylinders 38. As a result, the bridge assembly 100 is rapidly decelerated in the next few inches of travel. When the second proximity sensors 286 come upon the index flags 290, the PLC is again signaled to reverse the air flow to the rodless air cylinders 38. Immediately thereafter, the strike bars 276 contact the stationary rollers 292 and the bridge assembly 100 is held solidly in position over an egg flat 90, with each injector 300 directly over an egg. By momentarily reversing the air flow, the bridge assembly 100 comes to a gentle stop against the cam rollers 292, allowing high transition speeds between stopping points. After the eggs in an egg flat are injected and the bank of injectors 300 ascends to the "up" position, the strike bar 276 is momentarily retracted allowing the bridge assembly 100 to move to the next stopping point. When all of the eggs in the last egg flat at the front 34 of the base unit 22 have been injected, the bridge assembly 100 returns to the "home" position.

Figure 7:
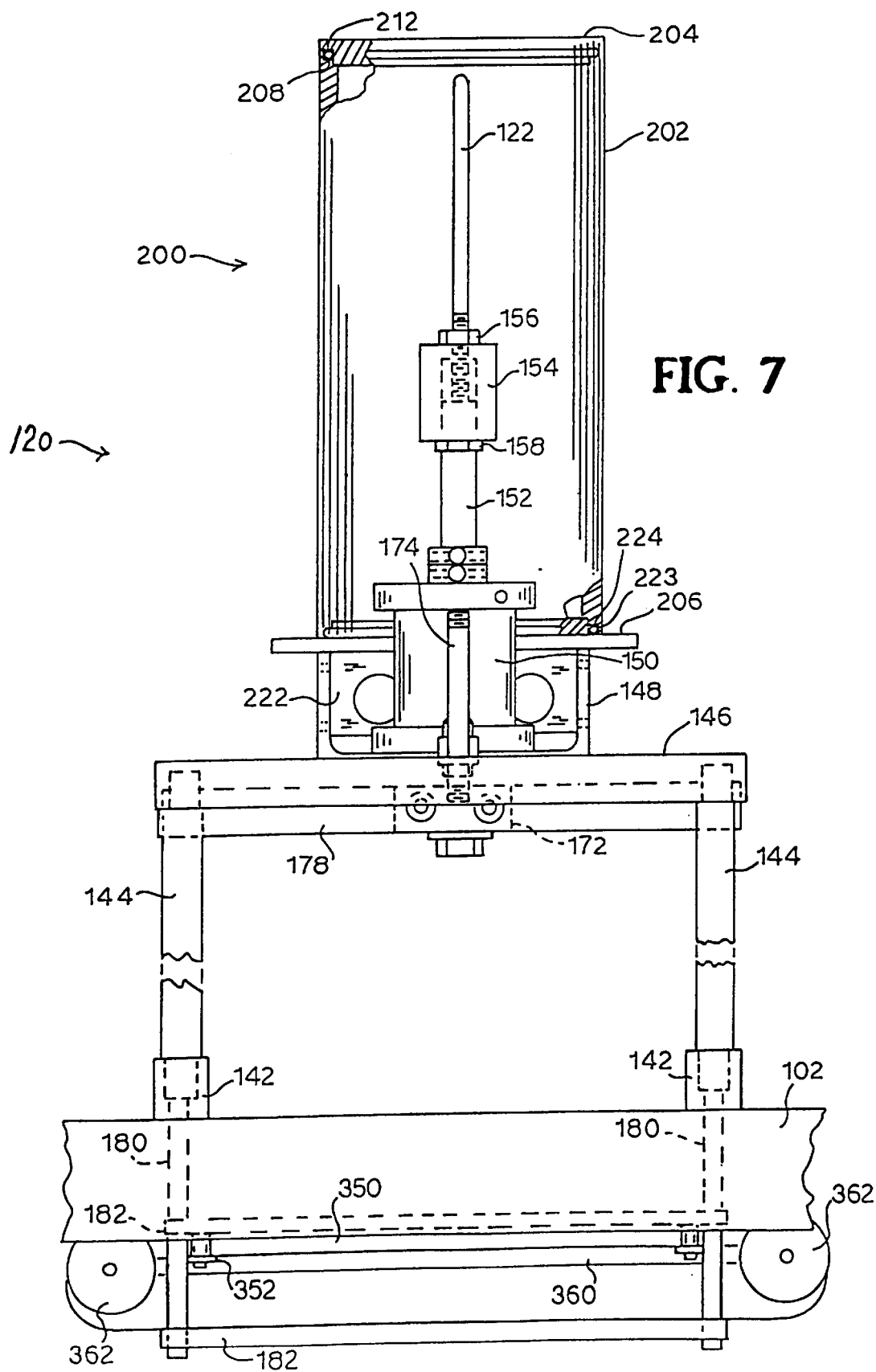
FIG. 7 is a rear elevation view of an injection assembly for use in the present invention.
Figure 8:
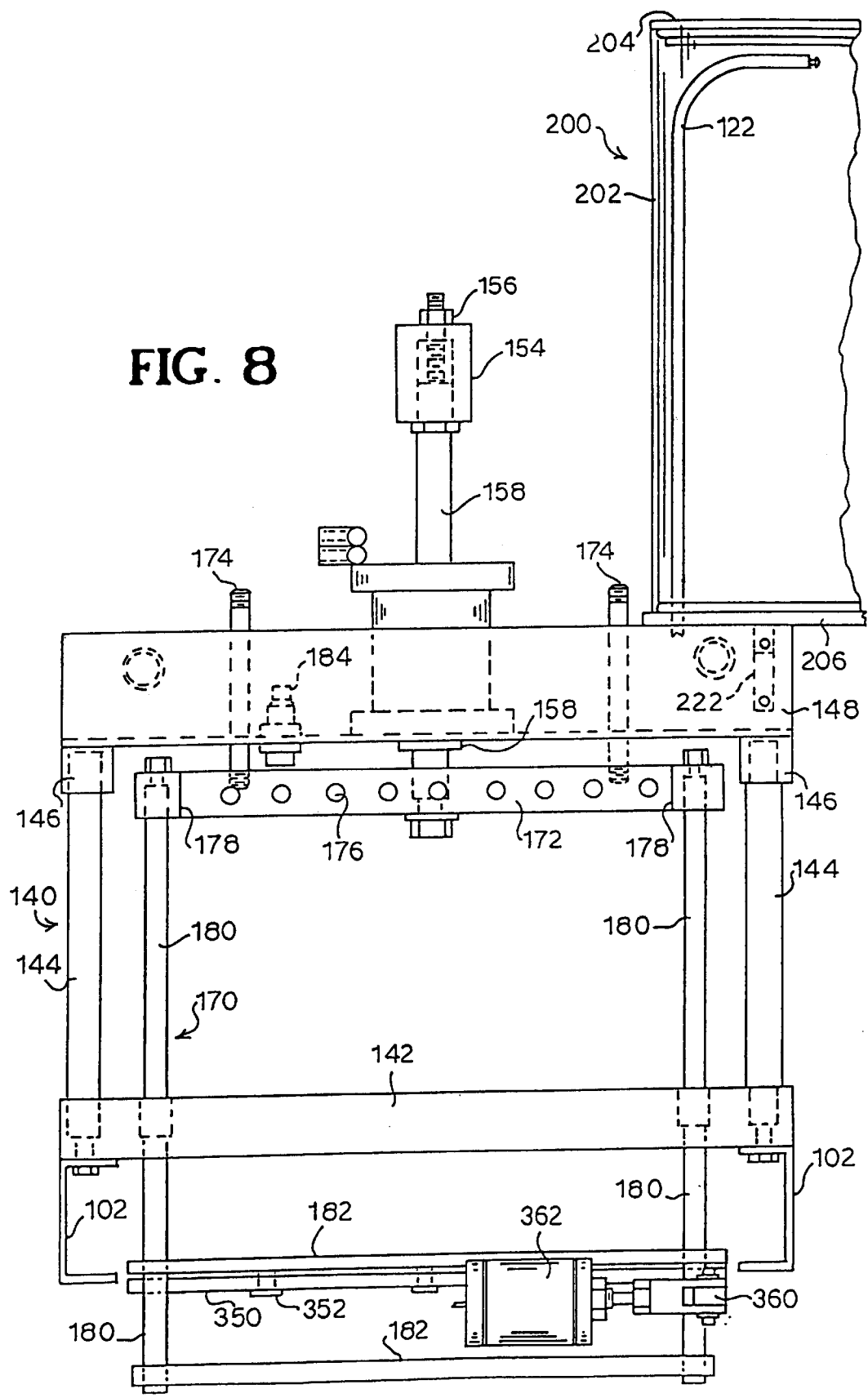
FIG. 8 is a left side elevation view of the injection assembly shown in FIG. 7.

The injection assembly is shown in FIGS. 7 and 8. The injection assembly 120 comprises a stationary vertical thruster assembly 140 and a vertically reciprocating injector thruster assembly 170. The vertical thruster assembly 140 includes two lower horizontal members 142 spanning the horizontal cross members 102 of the bridge assembly 100. Vertical members 144 extend upwardly from each end of the lower horizontal members 142 and support front and rear upper horizontal members 146. A large U-shaped bracket 148 is secured across the upper horizontal members 146. A vertically thrusting air cylinder 150 is centrally disposed in the bracket 148 with the cylinder rod 152 extending through the bracket 148. A stroke length adjuster 154 is threaded to the upper end of the cylinder rod 152. A lock nut 156 is provided for fixing the location of the stroke length adjuster 154. Bumpers 158 are placed on the cylinder rod 152 on either side of the bracket 148.

The lower end of the cylinder rod 152 is secured to a central horizontal member 172 of the injector thruster assembly 170. The central horizontal member 172 serves as an air manifold with each end having an air inlet 174 and nine air outlets 176 on each side for distributing air to injector air cylinders, as will be described below. Horizontal end members 178 are secured to the ends of the central horizontal member 172. Cylindrical slide bars 180 depend downwardly from each end of the horizontal end members 178. Spaced parallel upper and lower tooling plates 182 are secured to the bottom of the slide bars 180. A gripper plate 350 is mounted adjacent the upper tooling plate 182. The tooling plates 182 and gripper plate 350 include a plurality of openings 183 corresponding in position to egg holding depressions in the egg flat 90. A proximity sensor 184 is mounted in the bottom of the U-shaped bracket 148 for sensing when the central horizontal member 172 is adjacent the bracket 148 indicating that the injector thruster assembly 170 is in the "up" position. The proximity sensor 184 signals the PLC to permit movement of the bridge assembly 100 to the next injection position, or to return to the "home" position.

Figure 9A:
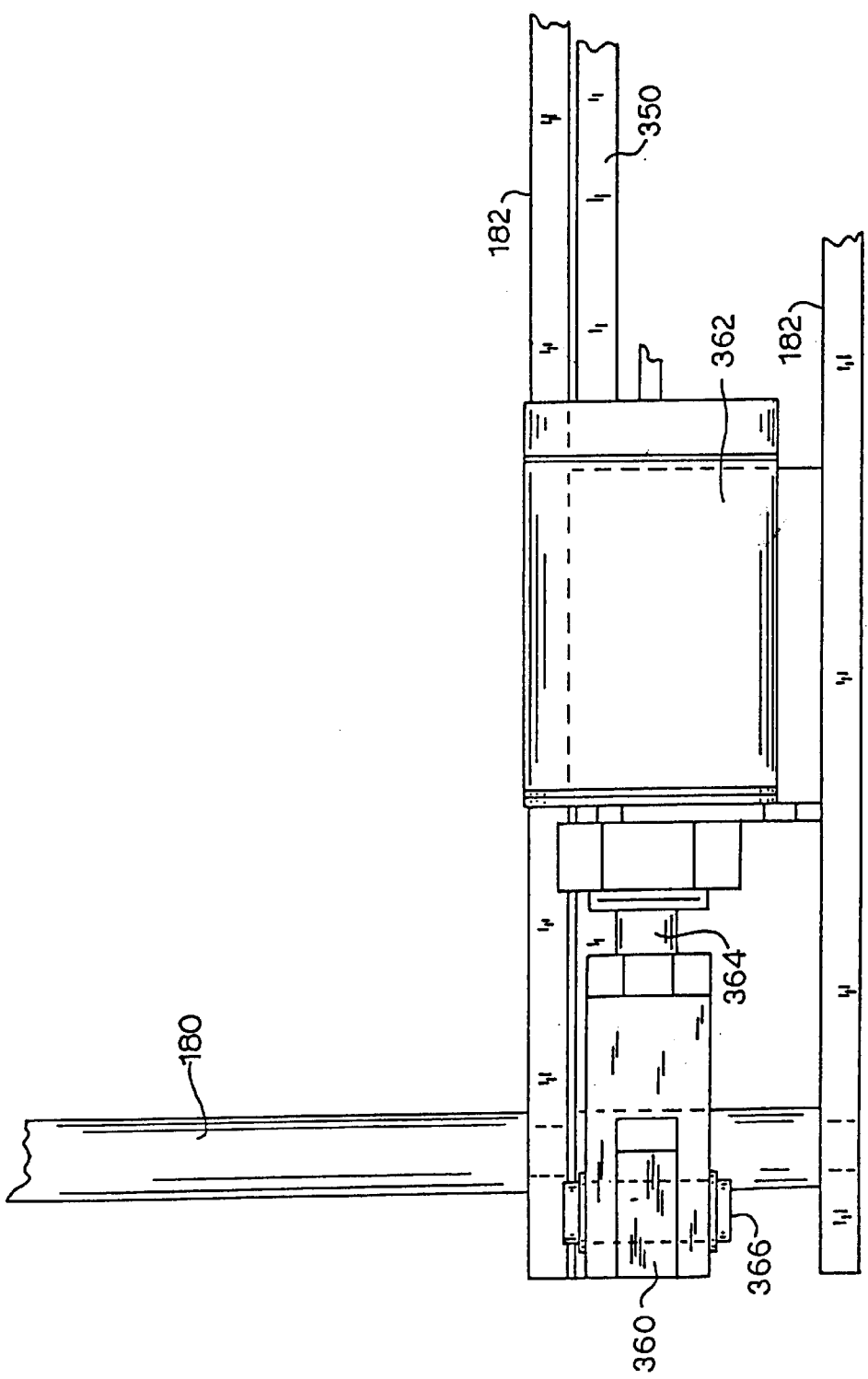
Figure 9C:
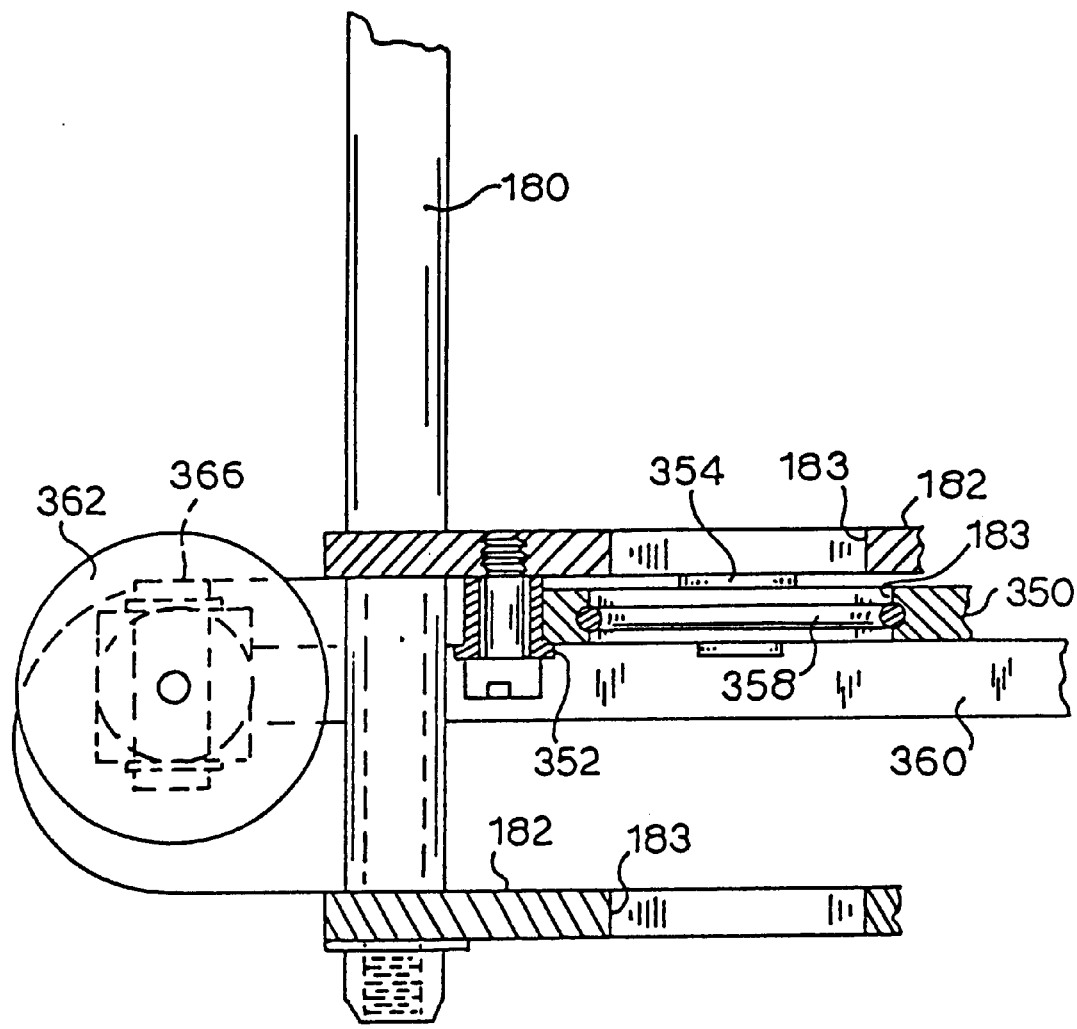

Referring now to FIGS. 9A, 9B and 9C, the gripper plate 350 is slidably mounted adjacent the upper tooling plate .182 on flange bearings 352 fastened to the upper tooling plate 182. Plastic slip bearings 354 are provided between the upper tooling plate 182 and the gripper plate 350 for smooth relative movement. The gripper plate 350 holes 183 are slightly larger than the tooling plates' holes 183. An o-ring 358 is disposed in an annular groove in each gripper plate hole 183. An elongated yoke 360 is secured across one end of the gripper plate 350. Opposed air cylinders 362 are mounted between the tooling plates 182. The air cylinder rods 364 are fastened to the ends of the yoke 360 by a pin 366.

Figure 10:
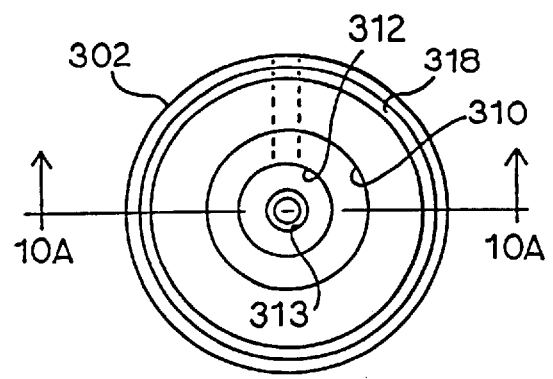
FIG. 10 is a top end view of an injector body and egg nesting cup for use in the present invention.
Figure 11:
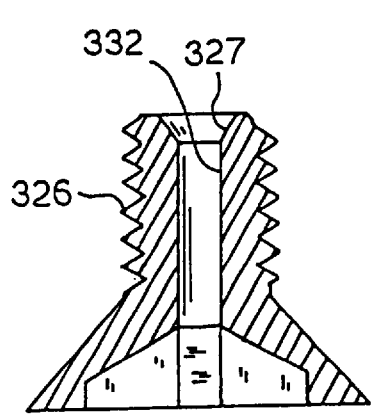
FIG. 11 is an elevation view of a needle guide sleeve for use in the present invention.
Figure 10A:
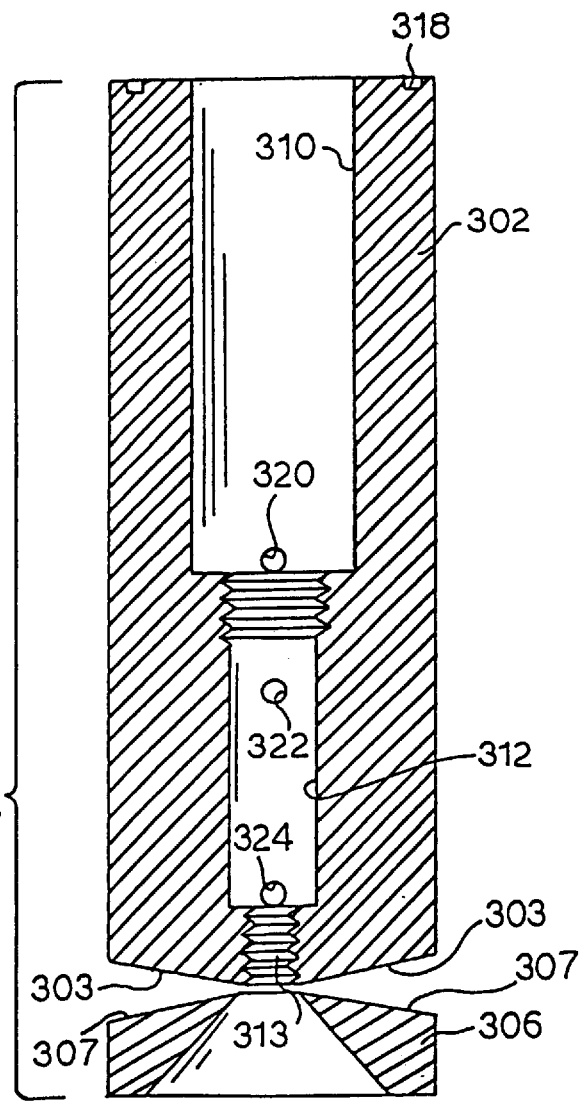
FIG. 10A is an elevation view of the injector body shown in FIG. 10 taken along line 10A—10A.
Figure 12:
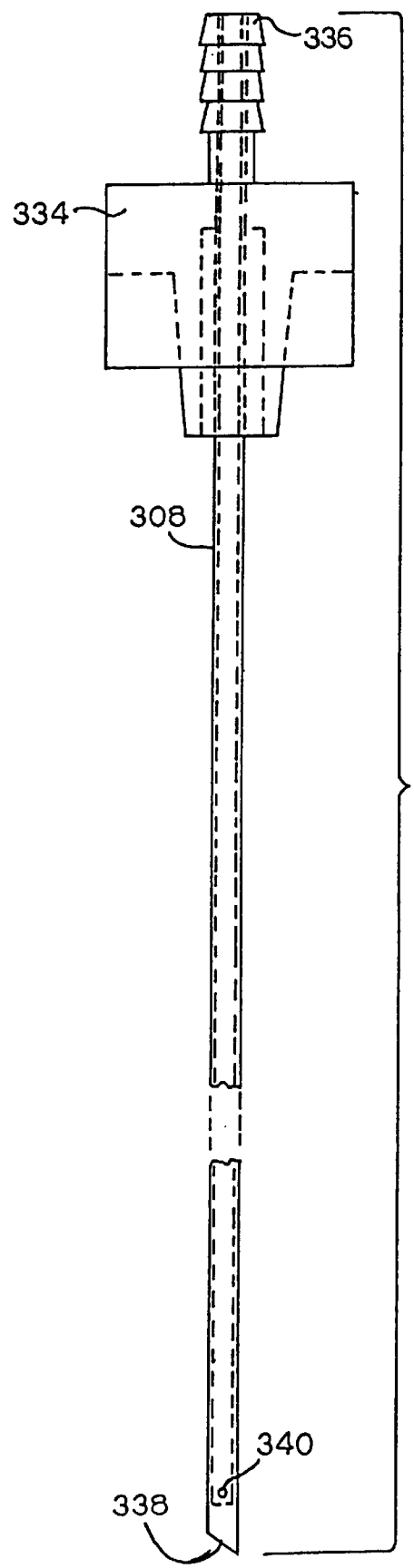
FIG. 12 is a side elevation view of a needle for use in the present invention.

The injector 300 comprises a high density polyethylene injector body 302 (FIGS. 10 and 10A), an air cylinder 304 (FIG. 13), an egg nesting cup 306 (FIG. 10A), a needle guide sleeve 326 (FIG. 11) and needle 308 (FIG. 12). The injector body 302 and egg nesting cup 306 are shown in FIGS. 10 and 10A. A coaxial bore 310 of varying diameter extends the length of the injector body 302, including first and second reduced diameter bore portions 312, 313. Three vent holes 320, 322, 324 are provided in the injector body 302. The upper vent hole 320 and lower vent hole 324 allow sanitizing fluid to drain. The middle vent hole 322 functions as an air vent for the lower vent hole 324.

The egg nesting cup 306 is frustoconical in shape. The egg nesting cup 306 is secured to the injector body 302 by a swivel bolt, or needle guide sleeve 326 (FIG. 11). For this purpose, the second, lower reduced diameter portion 313 of the injector body bore 312 is tapped and a heli-coil inserted for receiving the needle guide sleeve 326 and securing the egg nesting cup 306 to the bottom end of the injector body 302. When in place, there is a slight gap between the injector body 302 and nesting cup 306, as seen in FIG. 10A. The inner portion of the egg nesting cup 306 is also frustoconical in shape and is sized so that the eggs do not make contact with the needle guide sleeve 326. Generally, this can be accomplished in most cases using a preferred angle of the inner cone between about 80 degrees and about 100 degrees.

The lower end 303 of the injector body 302 and the upper surface 307 of the nesting cup 306 are angled away from their respective axial centers. The needle guide sleeve 326 allows the egg nesting cup to swivel freely with respect to its vertical axis and the injector body 302. Preferably, the lower 303 and upper 307 surfaces of the injector body 302 and the nesting cup 306, respectively, are cut away at an angle of at least seven degrees which permits the nesting cup 306 to swivel sufficiently to seat around an egg regardless of its orientation in the egg flat 90, even at the worst possible tilt. Less swiveling action than this could result in the top surface 307 of the nesting cup 306 contacting the bottom surface 303 of the injector body 302 and less than full circular contact of the nesting cup 306 around the top of the egg.

The inner end 327 of the needle guide sleeve is chamfered. The chamfered end 327 of the needle guide sleeve 326 acts as a reservoir for holding sanitizing fluid. An important feature of the present invention is that each time the needle 308 retracts during the sanitization sequence, fresh sanitizing fluid is drawn up into the reservoir 327 in the needle guide sleeve 326 by capillary action or surface tension on the needle cannula. The lowermost vent hole 324 allows old sanitizing fluid to escape as new fluid is drawn into the reservoir 327. Therefore, each time the needle retracts after injecting an egg, the end of the needle 308 is bathed in residual sanitizing fluid which helps to minimize cross-contamination of the eggs.

The needle 308 for use in the present invention is shown in FIG. 12. The upper end of the needle 308 is bonded through the center of a plastic Luer male hub fitting 334. The upper end of the fitting 334 includes a barbed flange 336 for connection to an appropriate fluid delivery tube so that fluid can be delivered to the needle 308 and to the egg. The needle tip 338 is beveled and plugged as high as the bottom of one or more radial outlet ports 340, preferably with a vinylester epoxy for strength. The beveled tip 338 is desirable since this type of needle 308 will tend to shear a hole in the egg starting at the very point of the tip. After the initial breakthrough, the needle tip 338 shears the remainder of a round hole, often creating a flap of shell at the hole.

The needle 308 is sufficiently large that the needle 308 can penetrate thousands of egg shells without bending, yet is thin enough to meter very small amounts of fluid in a precise manner. Preferably, the needle 308 used in the present invention is from about 12 gauge to about 20 gauge. A needle thicker than about 12 gauge could create cracks in the egg shell while a needle thinner than about 20 gauge is ordinarily too thin to repetitively penetrate an egg shell without bending. For example, a needle which is about 18 gauge (0.050 inches) is suitable, since this size fulfills all requirements. At the preferred needle thickness, the preferred bevel angle is from about 20 degrees to about 45 degrees. At angles less than about 20 degrees, the contact area between the needle tip 338 and the surface of the egg shell becomes large, thus requiring more force to break through the shell and possible cracking of the shells. Bevel angles greater than about 45 degrees necessitate positioning the radial outlet ports 340 farther from the tip 338. When the ports 340 are closer to the tip 338, the depth of penetration into the egg and the possibility of injection into the air cell, which reduces the benefit of the injected substance, are minimized. A suitable bevel angle is about 30 degrees which allows location of the radial outlet ports 340 about 0.1 inches from the needle tip 338 and leaves room at the heel of the tip 338 for filler. The needle is preferably stainless steel and the outside of the tip of the needle may be titanium-plated partially along its length. This allows the same needle to be used for a large number of injections without loss of sharpness or damage, usually evidenced by burrs on the leading edge of the needle tip 338. Alternatively, a pencil-point needle may be used.

Figure 13:
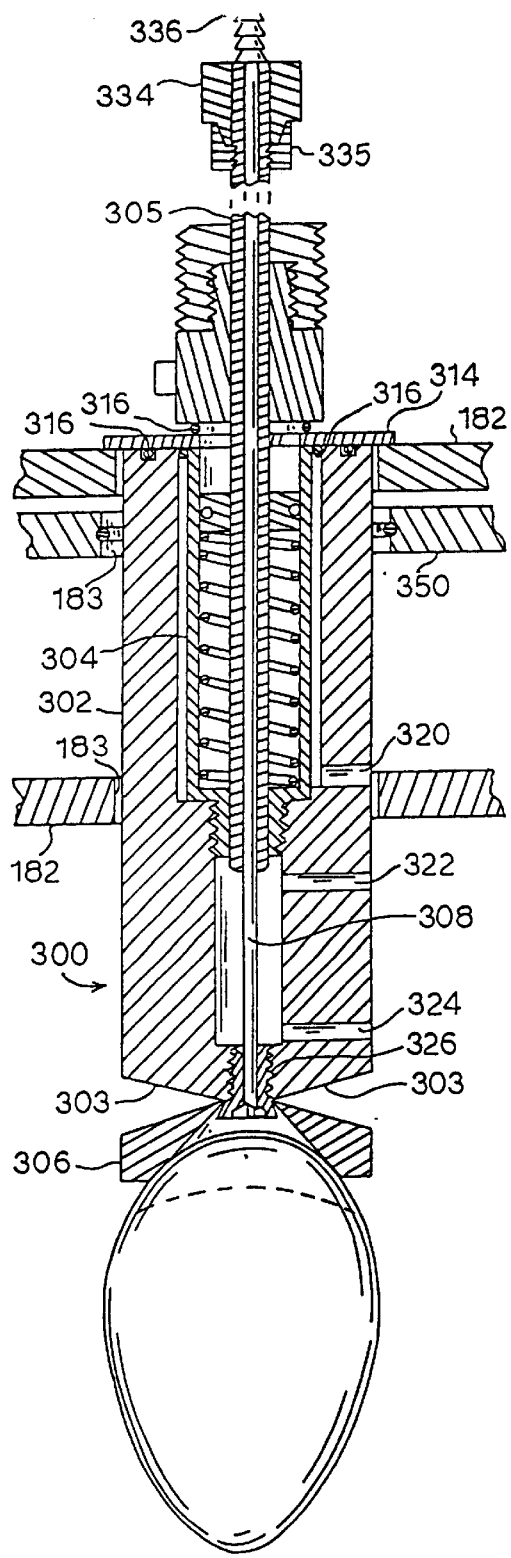
FIG. 13 is a cross-sectional view of an injector for use in the present invention resting in the tooling and gripper plates and in position on an egg.
Figure 13A:
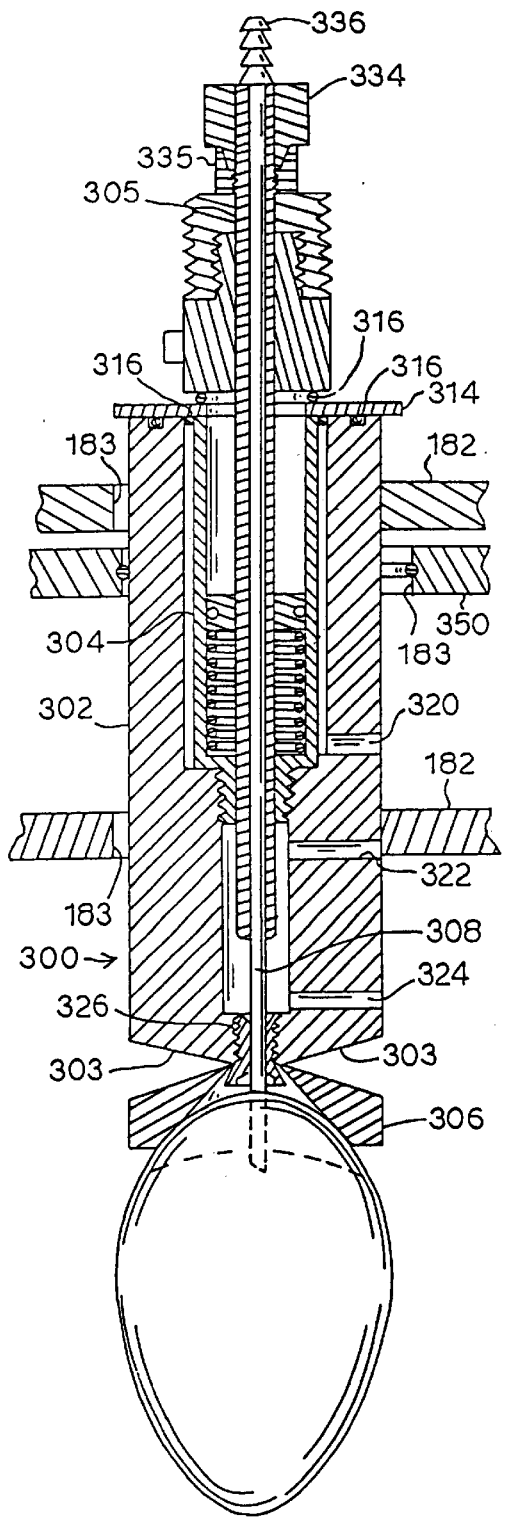
FIG. 13A shows the same view as FIG. 13 with the tooling and gripper plates lowered and the needle extended into the egg.

As shown in FIGS. 13 and 13A, an injector 300 fits substantially vertically in each opening 183 in the tooling plates 182 and gripper plate 350. As seen in FIG. 13, the openings 183 in the tooling plates 182 and gripper plate 350 are slightly larger in diameter than the diameter of the injector body 302 to allow vertical movement of the injector 300 relative to the plates 182, 350.

The upper, larger diameter portion of the bore 310 (FIG. 10A) loosely receives a singleacting spring return air cylinder 304. The lower end of the air cylinder 304 is threadably received in the first reduced diameter inner bore portion 312 (FIG. 10A). The upper vent hole 320 serves as an air outlet for the cylinder 304. A plastic ring 314 surrounds the upper end of the air cylinder 304 above the upper tooling plate 182 and is sandwiched by o-rings 316. The top of the injector body has an annular groove 318 (FIGS. 10 and 10A) for receiving a third o-ring 316. The o-rings 316 seal the plastic ring 314 against the upper end of the injector body 302 when the air cylinder 304 is threaded into place in the injector body 302.

The air cylinder rod 305 and needle guide sleeve 326 have an axial hole 332 (see FIG. 11 for sleeve 326) for receiving the needle 308. The male Luer fitting 334 at the top of the needle 308 is received in a complementary metal female Luer fitting 335 at the upper end of the cylinder rod 305 so that the needle 308 and air cylinder rod 305 move together. It is understood that a threaded fitting would also accomplish this result. The hole in the air cylinder rod 305 and the hole 332 in the needle guide sleeve 326 are only slightly larger than the outside diameter of the needle 308, thereby providing lateral support to the needle 308 for penetrating an egg shell. This diameter differential also allows easy removal and replacement of the needle 308 from a position on top of the injector thruster assembly 170. A suitable air cylinder having an axial hole is available from Bimba Manufacturing Company, of Monee, Ill., U.S.A., as part number D57441-A.

When the bridge assembly 100 is in position over an egg flat 90, the air cylinder 150 on the vertical thruster assembly 140 lowers the injector thruster assembly 170 and thus the injectors 300 toward the eggs. As the injector thruster assembly 170 descends two things happen. First, the swiveling egg nesting cups 306 receive and seat around the upper, large ends of the eggs. Because the egg nesting cups 306 swivel, the nesting cups 306 adjust to the position of the eggs as the injector assembly 170 descends, regardless of the orientation of the eggs in the egg flat 90. This allows the nesting cups 306 to make complete contact around the perimeter of the ends of the eggs.

Secondly, each injector 300 adjusts vertically to the height of the egg by virtue of the vertical movement of the injector 300 in the plates 118, 350. The stroke length adjuster 154 (FIG. 8) preferably limits the vertical stroke of the injector thruster assembly 170 so that the injectors 300 rise with respect to the plates 182, 350 about one inch, after making contact with the eggs. However, since the injectors 300 can move independently of one another, the injectors 300 rise to different heights so that different sizes of eggs can be accommodated even within the same egg flat. Further, because the design of the conventional egg flat dictates the center of rotation for each egg within the egg flat depression, the egg nesting cup 306 functions to align the center of rotation of the egg with respect to the needle 308 regardless of the orientation of the egg. Because of this alignment and along with the simultaneous vertical adjustment of the injector 300, the needle 308 will always extend to substantially the same point within the egg relative to the egg's center of rotation. The injection assembly 120 thus provides means for aligning the egg beneath the injector in a predetermined position with respect to the needle. Further, the depth and location to which the needle 308 penetrates is similarly predetermined by the distance of the center of rotation of the egg from the end of the injector 300. This ensures consistent penetration and injection location of the needle 308 within the egg regardless of variations in egg size and orientation.

When the injector thruster assembly 170 completes its downward travel the gripper plate air cylinder 362 (FIG. 9A) is activated moving the yoke 360 and gripper plate 350 outward. This movement forces the gripper plate o-rings 358 against the injector bodies 302 thereby holding the injectors 300 securely in position against the tooling plate holes 182 (FIG. 13A). Narrow horizontal grooves (not shown) machined in both the injector body 302 and the upper tooling plate holes 183 intermesh to help prevent vertical movement of the injectors 300. Thus, once the injectors 300 rise with respect to the descended plates 182, 350 to accommodate egg height, the gripper plate 350 clamps the injectors 300 in place, preventing the injector 300 from lifting off of the eggs. Otherwise, the injectors 300 could lift off of the eggs when the needles 308 make initial contact with the shell and then fall back down on the eggs as the needles 308 penetrate the egg shells, possibly cracking the egg shell.

Next, the needle air cylinder 304 is activated by pressurized air carried to the injectors 300 from the air outlets 176 (FIG. 8) in the central horizontal member of the injector thruster assembly 170. The air delivery tubes from opposed outlets deliver air to the injectors at opposite ends of a row of injectors 300. All of the injectors in the row are connected in series. This configuration evenly distributes line pressure and enables all the needles to extend and retract substantially at the same time. When the air cylinder 304 is activated, the needles 308 extend out of the injector body 302 a predetermined distance and with sufficient force to cause the beveled tip 338 of the needle 308 to shear through the egg shell. The needle 308 continues through the opening in the egg shell to an injecting position (FIG. 13A). The distance the needle 308 moves is determined by the stroke length of the air cylinder rod 305. The distance the needle tip 338 extends beyond the end of the injector body 302 may be adjusted by varying the thickness of the plastic ring 314. Alternatively, or additionally, washers of varying thickness' may be fitted between the plastic ring 314 and the air cylinder 304.

Once the air cylinder rod 305 and needle 308 reach maximum extension, fluid is injected into the egg through the radial outlet ports 340 (FIG. 12). The needle 308 retracts from the egg when air pressure is released from the needle air cylinder 304. At the same time as the needle 308 retracts, the gripper plate 350 is released and the plates 182, 350 and injector thruster assembly 140 (FIG. 8) move to the "up" position. The proximity sensor 184 senses the injector thruster assembly 140 is in the "up" position and signals the PLC to move the bridge assembly 100 over the next egg flat or return to the "home" position..

Figure 14:
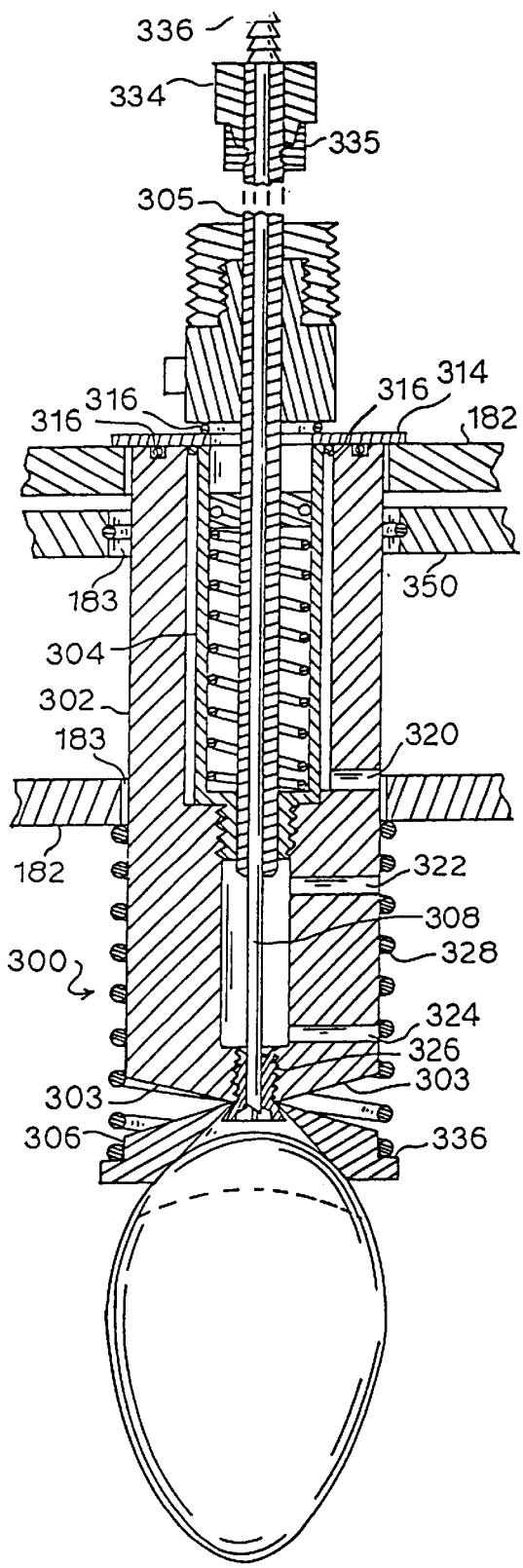
FIG. 14 is similar to FIG. 13 including a light spring around the lower portion of the injector.
Figure 14A:
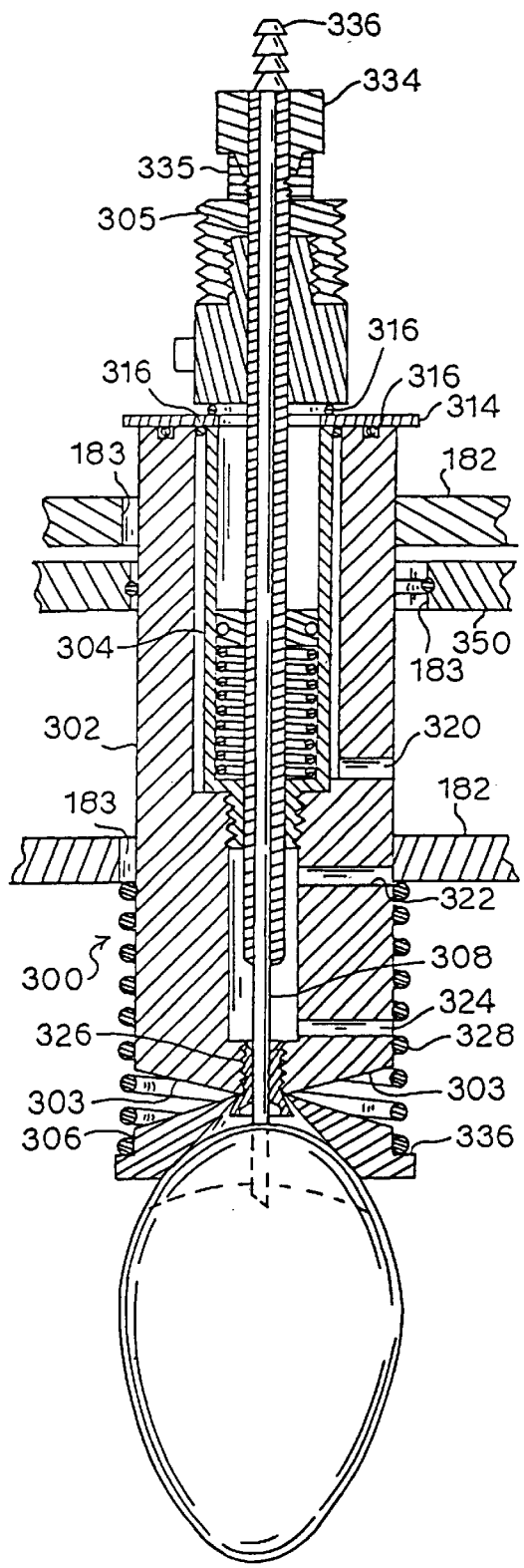
FIG. 14A shows the same view as FIG. 14 with the tooling and gripper plates lowered and the needle extended into the egg.

As shown in FIGS. 14 and 14A, a coil spring 328 may be provided surrounding the lower end of the injector body 302 and seated against a flange 330 on the nesting cup 306 and the lower tooling plate 182. The spring 328 provides mild resistance to the swiveling action of the egg nesting cup 306 and vertical movement of the injector body 302. The positive mechanical locking feature of the gripper plate 350 allows the use of a very light spring 328 which reduces the possibility of cracking or crushing fragile egg shells. Preferably, the spring is no more than about 1.5 lbs of force at full compression.

When ChickMaster® egg flats 90 are used, a vertically sliding egg flat detector bar, not shown, is provided through the tooling plates 182. Most conventional egg flats interlock end-to-end, with the exception of some ChickMaster® egg flats. Therefore, a ChickMaster® flat can be put in backwards and the injectors 300 will not align with the eggs. Attempting to inject the eggs under these circumstances will bend the needles. If the ChickMaster® flat is in the proper position, the egg flat detector bar will engage one of the egg flat spacers 92 (FIG. 2) as the injector thruster assembly 170 descends driving the detector bar upwardly. A proximity sensor, not shown, is mounted in the injector thruster assembly 170 and senses the detector bar when it is in the "up" position. The proximity sensor signals the PLC that injection of the eggs may proceed. If the ChickMaster® egg flat is in backwards, the detector bar will not engage the egg flat spacer 92 and will remain in the "down" position. Operation is stopped, the active clamp 72 opens and, if desired, an alarm or display is generated signaling the operator to pull the egg flats out and reverse the offending flat.

The above description is the preferred means for moving and locating the bridge assembly 100 and injection assembly 120. However, there may be applications in which the eggs are moved towards a stationary bank of needles. Also, the relative movement of the eggs and bridge assembly 100 and injection assembly 120 need not be carried out by the particular apparatus illustrated and described herein as any assembly which provides appropriate relative movement between the eggs and the needles is possible including, for example, a chain and sprocket mechanism or a servomotor or stepper motor drive with a timing belt or ball screw linear actuator. However, since the machine is preferably washable, pneumatic drive is preferred over electrical drive motors. An important feature of any suitable system is the proper, highly accurate positioning of the injection assembly and the eggs prior to injection so that each injector is aligned with an egg.

Referring back to FIGS. 7 and 8, the pressurized chamber 200 is shown and comprises an acrylic body 202, cap plate 204 and base plate 206. The cap plate 204 fits against a shoulder 208 in the top of the body 202 and has a chamfered bottom edge for seating against an o-ring 212 disposed in a groove in the top of the body 202.

Figure 15:
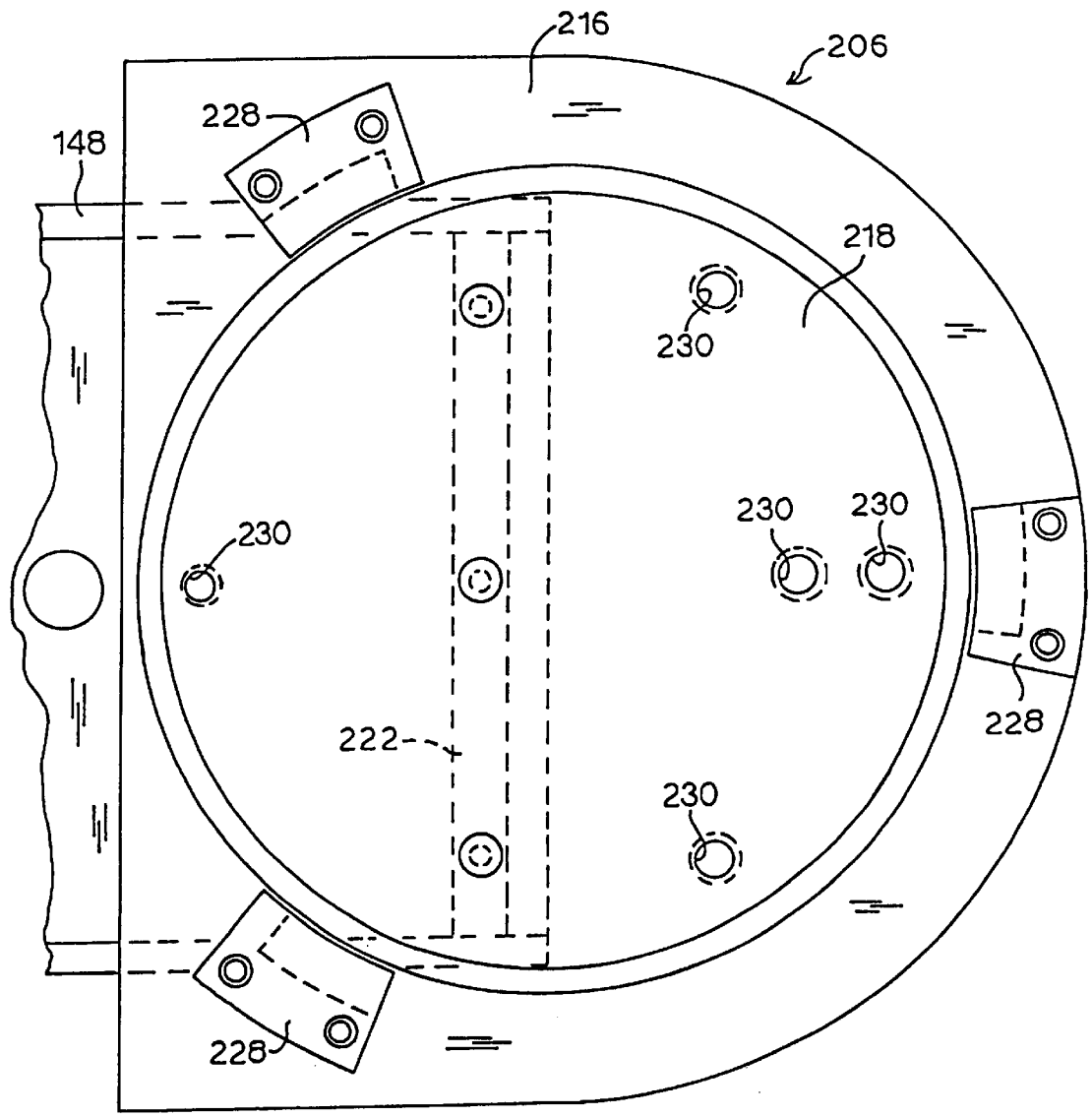
FIG. 15 is a top plan view of a pressurized chamber base plate for use in the present invention.

As seen in FIG. 15, the base plate 206 includes a large base portion 216 and an integral circular upper plate 218. The base plate 206 is fastened to a base mount 222 which extends across the U-shaped bracket 148 of the vertical thruster assembly 140. Holes 230 are provided in the base plate 206. One of the holes 230 has dual o-ring grooves for accepting a fluid delivery tube for a fluid outlet and to ensure that the pressurized chamber 200 is air-tight. Two other holes are threaded for a pressurized air inlet and a pressure relief safety valve, respectively.

The chamber body 202 fits down over the circular upper plate 218 until a shoulder 224 (FIG. 7) in the bottom of the body 202 engages the circular base plate 218. The seal between the chamber and base consists of a large o-ring 223 mounted on the periphery of the upper plate 218. The body 202 is held in place by rotating the body so that ears on the base of the body 202 fit into locking dogs 228 on the base plate 206 (FIG. 15). More than one fluid delivery tube hole or pressurized chamber may be provided in the event that one or more fluids are to be injected into the eggs.

Figure 16:
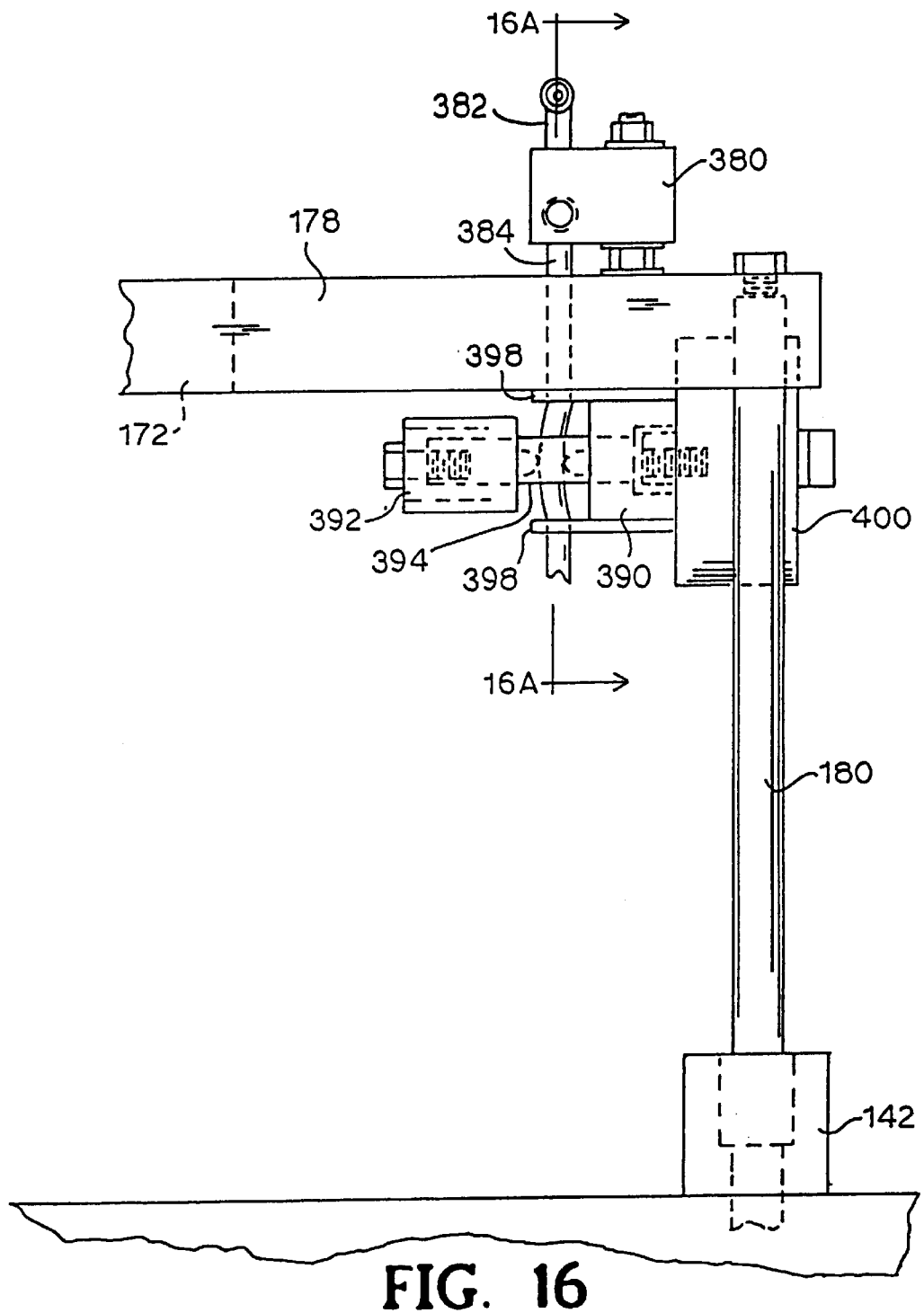
FIG. 16 is a partial elevation view of a fluid manifold and pincher assembly for use in the present invention.
Figure 16A:
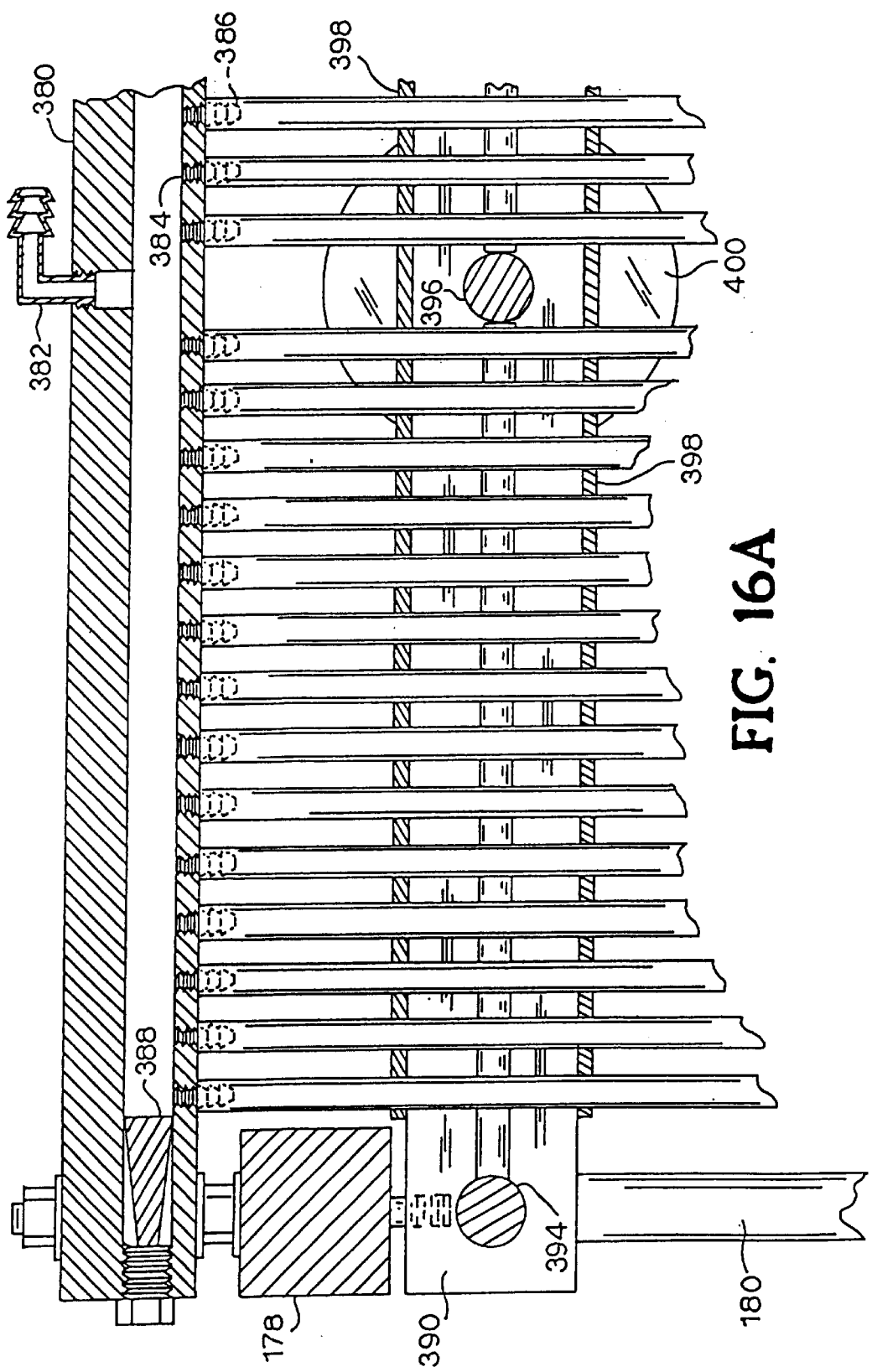
FIG. 16A is a partial cross-section view taken along line 16A—16A of FIG. 16.

The fluid delivery tube projects downward through the base plate 206 carrying fluid under pressure from the bag and chamber. The fluid delivery tube splits and carries fluid to dual high density polyethylene manifolds 380 (FIGS. 16 and 16A) secured across the top of the horizontal end members 178 of the injector thruster assembly 170 (FIG. 8). Each manifold 380 has a fluid inlet 382 for each fluid to be injected, and enough fluid outlets 384 to supply fluid for half of the injectors 300. The ends of the manifold include a plug 388 to the first fluid outlet 384 to eliminate dead space.

A fluid delivery tube for each injector 300 extends from a barbed fitting 386 in each outlet 384 and passes between cooperating stationary 390 and dynamic 392 pincher plates. The stationary pincher plate 390 is secured beneath the manifolds 380 to the underside of the horizontal end members 178 of the injector thruster assembly 170. The dynamic pincher plate 392 is slidably mounted on spaced, parallel linear guide shafts 394 extending from the ends and middle of the stationary pincher plate 390. The middle shaft 394 passes slidably through the stationary pincher plate 390 and is connected to an air cylinder rod 396 to draw the pincher plates 390, 392 together to pinch off the fluid delivery tubes. Vaccine tube guide plates 398 having a hole for each tube are positioned on the top and bottom of each stationary pincher plate 390 to maintain the alignment of the delivery tubes and smooth movement of the pincher plates 390, 392.

Normally the pincher plates 390, 392 are closed, pinching off the fluid delivery tubes. The only time the pincher plates 390, 392 open is immediately after the needle 308 reaches the injection location in the egg. At this point, the air cylinder 400 connected to the middle bearing shaft 394 is activated; and the pinchers 390, 392 open, allowing fluid from the pressurized fluid bag to flow through the hoses and needles into the egg. The pinchers remain open for a specific time, allowing a predetermined amount of fluid to be delivered into the egg, and then the pinchers 390, 392 close. The fluid quantity delivered may be precisely controlled by the amount of pressure on the fluid bag within the pressurized chamber 200 and the length of time the pinchers 390, 392 remain open.

Of course, other means for delivery of predetermined amounts of fluid can be used including, for example, infuser cuffs wrapped around the fluid bag or metered injection pumps. Infuser cuffs function much like the pressure chamber described above, squeezing the bags to drive the fluid. However, infuser cuffs sometimes suffer from non-uniform fluid flow as the fluid bag empties since fluid flow slows considerably when the bag is less than about half-fall. Therefore, uniform flow throughout all dosages as the bag empties is not possible. The preferred method empties the fluid bag while providing the same precise delivery amount until the bag is empty. Metered injection pumps, such as peristaltic pumps, are very precise in the amount of fluid delivered. However, such pumps suffer from a tendency to destroy live vaccine cells which can be crushed by the action of the pumps. For example, peristaltic pumps compress the fluid lines, increasing the probability of crushing live vaccine cells and diminishing the effectiveness of the fluid delivered. The preferred pincher plates, described above, have only a single tangent compression point and will disrupt very few cells. Therefore, the preferred fluid delivery method eliminates the pumping of fluids through conventional fluid handling systems and offers both precise and cell-safe fluid delivery.

The apparatus of the present invention described herein provides a method for automatically injecting eggs with a desired fluid at a predetermined location within the egg. The method of the present invention is applicable to any bird egg, and particularly those which are commercially reared for meat or egg production. Any substance may be efficiently and precisely injected into the egg, including without limitation antimicrobials such as antibiotics, bactericides, sulfonamides; vitamins; enzymes; nutrients; organic salts; hormones; adjuvants; immune stimulators; vaccines and the like.

The scope of the method of the present invention extends to immunization against all immunizable avian diseases, whether of viral, bacterial or other microbial origin. Birds which are reared in high density brooder houses, such as broiler and layer chickens, are especially vulnerable to infectious agents and would largely benefit from pre-hatch vaccination. Examples of such, without limitation, are Marek's disease, infectious bronchitis, infectious bursal, Newcastle disease, adenovirus diseases, reovirus, pox, laryngotracheitis, influenza, infectious coryza, fowl typhoid and fowl cholera. Vaccinating avian embryos potentially increases hatchability and livability during grow-out.

Figure 17:
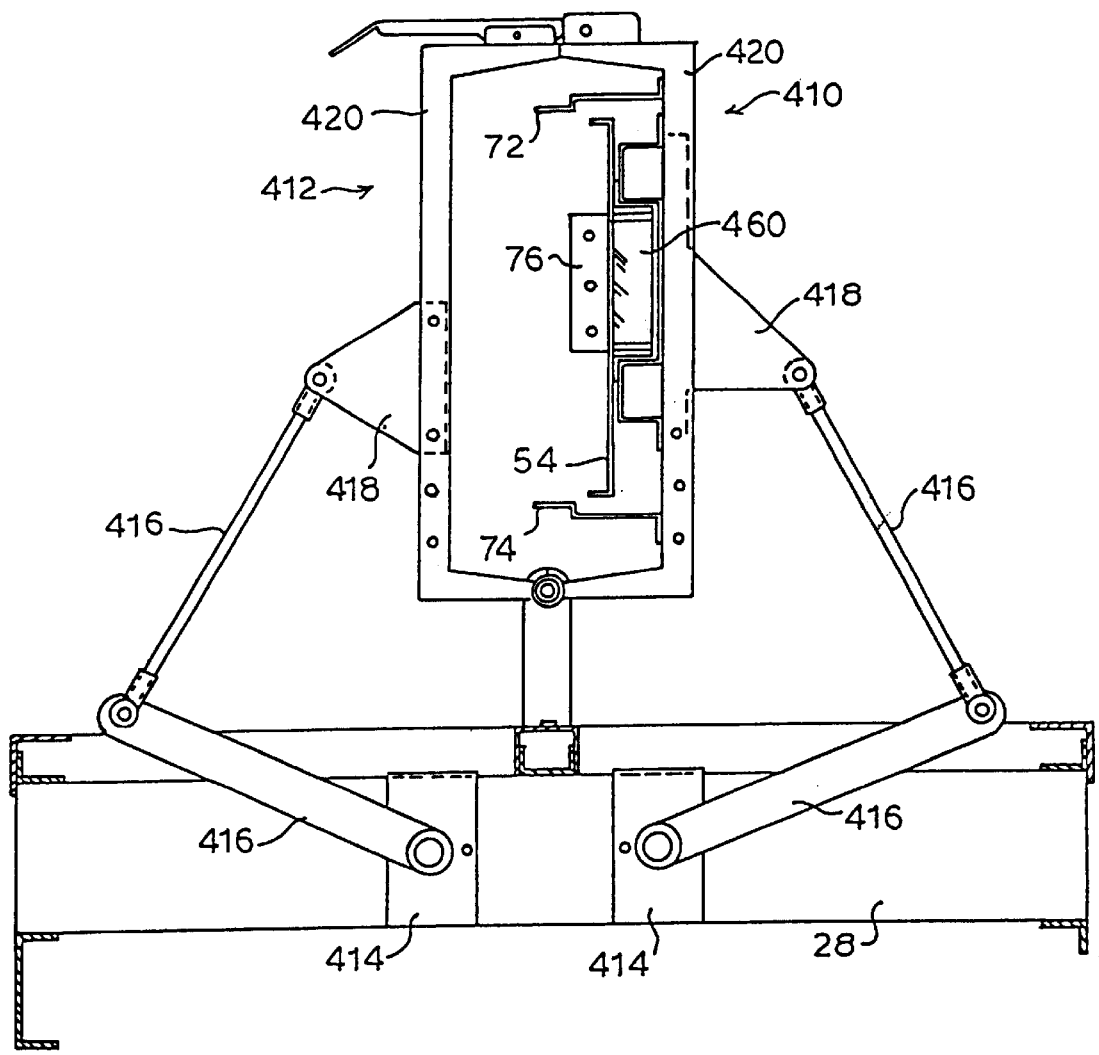
FIG. 17 is a partial rear view of an embodiment of the egg injection apparatus of the present invention with the rotator assemblies thereof pivoted into upright positions.

The apparatus and method of the present invention further contemplate means for transferring the eggs following injection from the egg flats into a hatching tray. The preferred means for transferring the eggs is disclosed in U.S. Pat. Nos. 5,107,794 and 5,247,903, referred to above, the egg-receiving framework 70 forming a part thereof. As described therein, and in connection with FIG. 17, active and passive rotator assemblies transfer eggs from the egg flats to a hatching tray. Handles are provided on each of the rotator assemblies for rotating the assemblies from their rest to their transfer positions. However, automated transfer is preferred for use in the present invention. Accordingly, pneumatic active and passive rotary actuators 414, comprising pneumatic double rack-and-pinion 180-degree rotation rotary actuators, are secured to the strut members 28 of the horizontal bracket assembly 26. Pivoted transfer arms 416 connect the rotary actuators 414 to linkage brackets 418 on the u-shaped support members 420 of the rotator assemblies 410, 412.

The transfer step can occur simultaneously with the spray sanitization cycle. The operator initiates transfer by placing a hatcher tray 94 over the eggs in an upside-down position. A frame member 422 positioned about midway along the horizontal bracket assembly 26 supports a photovoltaic cell and sensor. The sensor is tripped when the hatcher tray 94 is placed over the eggs signaling the PLC to start the transfer operation. First, the passive rotary actuator 414 rotates the passive rotator assembly 412 clockwise until it is in place over the eggs. The rotator assemblies 410, 412 are automatically latched together. The passive rotary actuator 414 reverses and the active rotary actuator 414 is activated swinging both rotator assemblies 410, 412 counterclockwise −180 degrees and depositing all of the eggs in the hatcher tray 94. The rotator assemblies 410, 412 are automatically disengaged and the active rotary actuator 414 brings the active rotator assembly 4 10 and empty egg flats back to the rest position. A proximity sensor 424 signals the PLC that the active rotator assembly 410 is in the rest position. The active clamp 72 opens allowing the operator to remove the egg pallet 54 and empty egg flats.

The total time required for the injection cycle, from securing the egg flats in place to removing the empty flats, is about 16 seconds. It is estimated that with the apparatus and method of the present invention one trained operator can inject over 20,000 eggs per hour.

The present invention has many advantages, including providing an egg injection apparatus comprising an injector designed to position itself in relation to an egg so that the injection location within the egg is precise and consistent. The articulating egg nesting cup ensures that the needle extends to the same region within the egg despite the orientation of the egg in the egg flat. Because the design of the conventional egg flat dictates the axis of rotation for each egg within its depression in the egg flat, the relationship defined by the seated position of the cup against the egg can position the extended needle at a predetermined location within the egg with respect to the center of rotation of the egg. Because the center of rotation remains relatively fixed with respect to the needle and the vertical adjustment of the injector ensures that the needles always extend to a predetermined depth inside the egg regardless of egg size, the tip of the needle will always extend to what is substantially the same point with respect to the center of rotation of the egg. Thus, a plurality of eggs can be consistently injected at a desired location, both horizontally and vertically, regardless of individual differences in egg size and orientation.

The precision with which the apparatus of the present invention can position the injection site allows for vaccination into areas previously too small for reliable, consistent injection location, such as the allantois. Injection into the allantois offers advantages. For example, injection into the allantois in the fourth quarter of incubation allows for biologically effective injections without damage to the embryo which can be caused by impact of the needle if the injection is made into the larger, amniotic area which immediately surrounds the embryo itself.

The needle design of the present invention allows for egg shell penetration without a punch or drill. The solid needle tip allows the tip to be less sharp and still penetrate thousands of egg shells. Moreover, the larger bore possible with the large gauge needle allows fluid to be delivered with less shear forces.

The fluid delivery system of the present invention moves fluids through the system under low internal line pressure without pumping. Fluid is injected rapidly. The radial outlet holes can prevent direct fluid impingement on the yolk and embryo. Moreover, due to the low internal line pressure, hydraulic shear is minimized and cell integrity maximized. This is important since vaccine efficacy is dose-related and depends on cell integrity in vaccines such as for Marek's disease. Thus, the apparatus of the present invention is particularly useful in vaccine delivery since the apparatus will destroy fewer cells in the delivery process and therefore a higher actual vaccine titer will be delivered.

The apparatus and method of the present invention also offer a very sanitary injection environment. All egg contact surfaces are sanitized frequently. The sanitary environment minimizes the potential for cross-contamination of eggs. Moreover, the sanitization system is designed to be independent of the injection system thereby eliminating congested tubing. The positioning of the spray nozzles along the manifold and the traversing of the manifold across the sump pan insures complete, uniform coverage of the sanitization fluid on all portions of the injector which touch the eggs during the injection process. The sanitization spray directly impinges both sides of the needles and the outside edges of the egg nesting cups. The radial outlet holes of the needle prevent spray from entering the needle and potentially killing live cells or vaccine virus.

Further, radial egg transfer of the injected eggs form the egg flats to the hatcher is a vast improvement over the known egg transfer method using vacuum cups. The vacuum cups potentially provide an easy path for cross-contamination of the eggs. In the present invention, after the egg is injected, the only other object to touch the eggs is the sanitary hatcher tray. Thus, a possible path for cross contamination is eliminated. Moreover, the apparatus of the present invention is easily cleaned in a few minutes, as opposed to the vacuum cups and manifold which must be disassembled and placed in an aerated chemical bath for more than 30 minutes. The apparatus of the present invention effects a marked increase in productivity. The simplicity of the egg handling path reduces labor. One operator can perform all necessary operations, whereas the known technology requires two operators who have to continuously coordinate their tasks carefully for smooth and efficient operation. The present invention also allows feeding several egg flats at one time instead of the known technology of feeding one egg flat at a time on a movm*g conveyor. The present method frees the operator to perform other tasks after he has loaded the eggs into the apparatus. Outputs are greater than with double the labor on the current machine. The apparatus of the present invention is simply built resulting in a decrease in manufacturing and operating cost over known devices and methods. Although the apparatus and method of the present invention have been described in considerable detail in connection with preferred embodiments thereof, it will be understood, of course, that I do not intend to limit the invention thereto since modifications may be made by those skilled in the art, particularly in light of the foregoing teachings. On the contrary, I intend to cover all alternatives, modifications and equivalents as incorporate those features which constitute the essential features of these improvements as may be included within the spirit and scope of my invention.

I claim:

1. A needle for use in injecting eggs with fluid substances comprising:
    (a) a hollow interior;
    (b) a longitudinal axis;
    (c) a closed distal end;
    (d) an opening adjacent to said closed distal end which extends radially outward from said longitudinal axis and is in fluid communication with said hollow interior, wherein the needle is adapted to penetrate an egg without causing fissures to the shell and capable of depositing fluid inside the amnion of the egg.

2. A needle as recited in claim 1, wherein the said needle tip is coated with titanium.

3. A needle as recited in claim 1, wherein the said needle tip is beveled at an angle of from 0 degrees to about 45 degrees.

4. A needle as recited in claim 1, wherein the needle thickness is from about 20 gauge to about 12 gauge.

5. A needle as recited in claim 1, wherein the needle has multiple radial outlet openings adjacent to said closed distal end.

* * * * *